United States Patent
Otsuki et al.

(10) Patent No.: US 7,951,495 B2
(45) Date of Patent: May 31, 2011

(54) NON-AQUEOUS ELECTROLYTE FOR BATTERY AND NON-AQUEOUS ELECTROLYTE BATTERY COMPRISING THE SAME AS WELL AS ELECTROLYTE FOR ELECTRIC DOUBLE LAYER CAPACITOR AND ELECTRIC DOUBLE LAYER CAPACITOR COMPRISING THE SAME

(75) Inventors: Masashi Otsuki, Tokyo (JP); Hiroshi Kanno, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 404 days.

(21) Appl. No.: 12/159,036

(22) PCT Filed: Dec. 1, 2006

(86) PCT No.: PCT/JP2006/024104
§ 371 (c)(1),
(2), (4) Date: Jun. 24, 2008

(87) PCT Pub. No.: WO2007/074609
PCT Pub. Date: Jul. 5, 2007

(65) Prior Publication Data
US 2010/0304223 A1 Dec. 2, 2010

(30) Foreign Application Priority Data

Dec. 26, 2005 (JP) ................................. 2005-372173
Dec. 26, 2005 (JP) ................................. 2005-372178
May 17, 2006 (JP) ................................. 2006-138044
May 18, 2006 (JP) ................................. 2006-139198

(51) Int. Cl.
*H01M 6/14* (2006.01)
*H01M 6/16* (2006.01)
*H01G 9/038* (2006.01)
*H01G 9/155* (2006.01)

(52) U.S. Cl. ........ 429/339; 429/324; 429/199; 429/188; 361/502; 252/62.2

(58) Field of Classification Search .................. 429/324, 429/188, 199, 203, 339; 361/502; 252/62.2
See application file for complete search history.

(56) References Cited

FOREIGN PATENT DOCUMENTS

| JP | 2004-111294 A | | 4/2004 |
|---|---|---|---|
| JP | 2004-146346 A | | 5/2004 |
| JP | 2006-36709 A | | 2/2006 |
| JP | 2006-080488 A | * | 3/2006 |
| WO | 2006/117872 A1 | | 11/2006 |

OTHER PUBLICATIONS

Machine Translation of JP 2006-080488 A, Kanno et al., Mar. 2006.*
Abstract of JP 2006-080488 A, Kanno et al., Mar. 2006.*
Machine Translation of JP 2006-036709 A, Inoue et al., Feb. 2006.*

* cited by examiner

Primary Examiner — Jonathan Crepeau
Assistant Examiner — Kenneth Douyette
(74) Attorney, Agent, or Firm — Sughrue Mion, PLLC

(57) ABSTRACT

This invention relates to a safe electrolyte having no risk of igniting-firing, and more particularly to a non-aqueous electrolyte for a battery comprising an ionic liquid composed of a cation portion and an anion portion, and a supporting salt, characterized in that the cation portion of the ionic liquid contains phosphorus and nitrogen, as well as an electrolyte for an electric double layer capacitor comprising an ionic liquid composed of a cation portion and an anion portion, characterized in that the cation portion of the ionic liquid contains phosphorus and nitrogen.

12 Claims, 11 Drawing Sheets

NON-AQUEOUS ELECTROLYTE FOR BATTERY AND NON-AQUEOUS ELECTROLYTE BATTERY COMPRISING THE SAME AS WELL AS ELECTROLYTE FOR ELECTRIC DOUBLE LAYER CAPACITOR AND ELECTRIC DOUBLE LAYER CAPACITOR COMPRISING THE SAME

TECHNICAL FIELD

This invention relates to a non-aqueous electrolyte for a battery and a non-aqueous electrolyte battery comprising the same as well as an electrolyte for an electric double layer capacitor and an electric double layer capacitor comprising the same, and more particularly to a safe electrolyte comprising an ionic liquid containing phosphorus and nitrogen in its cation portion and having no risk of igniting-firing.

BACKGROUND ART

Recently, batteries having a light weight, a long service life and a high energy density are demanded as a main power source or an auxiliary power source for electric automobiles and fuel cell vehicles, or as a power source for small-size electronics devices. For this demand, a non-aqueous electrolyte battery using lithium as an active substance for a negative electrode is known as one of the batteries having a high energy density because an electrode potential of lithium is the lowest among metals and an electric capacity per unit volume is large, and many kinds of such a battery are actively studied irrespectively of primary battery and secondary battery, and a part thereof is practiced and supplied to markets. For example, the non-aqueous electrolyte primary batteries are used as a power source for cameras, electronic watches and various memory backups. Also, the non-aqueous electrolyte secondary batteries are used as a driving power source for note-type personal computers, mobile phones and the like, and further they are investigated to use as the main power source or the auxiliary power source for the electric automobiles and the fuel cell vehicles.

In these non-aqueous electrolyte batteries, since lithium as an active substance for a negative electrode violently reacts with a compound having an active proton such as water, alcohol or the like, an electrolyte used in these batteries is limited to an aprotic organic solvent such as ester compound, ether compound or the like. Although the aprotic organic solvent is low in the reactivity with lithium as the active substance for the negative electrode, there is a high risk that if a large current flows violently, for example, in the short-circuiting or the like and the battery generates abnormal heat, the aprotic organic solvent is vaporized and decomposed to generate a gas, or the generated gas and heat cause explosion and ignition of the battery, fire is caught by a spark generated in the short-circuiting or the like.

Moreover, an electric double layer capacitor is a condenser utilizing an electric double layer formed between an electrode and an electrolyte, in which a cycle of electrically adsorbing an ion on a surface of the electrode from the electrolyte is a charge-discharge cycle, so that it is different from a battery in which a cycle of oxidation-reduction reaction accompanied with a mass transfer is a charge-discharge cycle. Therefore, the electric double layer capacitor is excellent in the instant charge-discharge characteristics as compared with the battery, and further it has many merits that the instant charge-discharge characteristics are not substantially deteriorated even in the repetition of the charge-discharge because it is not accompanied with the chemical reaction, a simple and cheap electric circuit is sufficient in the electric double layer capacitor because there is no overvoltage in the charge-discharge, the residual capacity is easily understandable, the temperature durability is good over a wide temperature range of $-30$ to $90°$ C. and there is no pollution and the like, as compared with the battery. Therefore, the electric double layer capacitor is widely studied as a lower-capacity type for a memory backup or the like, a medium-capacity type for assisting a power of an electric automobile or the like and a higher-capacity type as a substitute for an accumulator battery for electric power storage or the like.

In a contact interface between the electrode and the electrolyte of the electric double layer capacitor, positive and negative charges are oppositely arranged at an interval of a very short distance to form an electric double layer. Therefore, the electrolyte plays a role as an ion source for the formation of the electric double layer, so that it is an important substance dominating the basic characteristics of the electric double layer capacitor likewise the electrode. As the electrolyte, there have hitherto been known an aqueous electrolyte, a non-aqueous electrolyte, a solid electrolyte and the like.

On the other hand, since a report of Wilkes et al. in 1992, an ionic liquid attracts attention as a substance which is a liquid at normal temperature and excellent in an ion conductivity. In the ionic liquid, a cation is bonded with an anion via an electrostatic attraction, the number of the ion carrier is very large, a viscosity is relatively low and thereby an ion mobility is high even at normal temperature, so that the ionic liquid has a very high ion conductivity. Further, the ionic liquid has a high boiling point and a very wide temperature range in which it can remain in a liquid state, because it consists of the cation and anion. Furthermore, the ionic liquid is low in a flammability and very excellent in a thermal stability, because it has little vapor pressure (see J. Electrochem. Soc., 144 (1997) 3881 and "Function Creation and Application of Ionic Liquid", N. T. S, (2004)). The ionic liquid has these various merits, so that it is recently studied to apply to electrolytes for a non-aqueous electrolyte secondary battery and an electric double layer capacitor (see JP-A-2004-111294 and JP-A-2004-146346). In particular, when the ionic liquid is used in the electrolyte for the electric double layer capacitor, it also serves as an ion source for forming an electric double layer, so that there is also a merit that it is not necessary to add an additional supporting electrolyte.

DISCLOSURE OF THE INVENTION

However, the inventors have studied and discovered that the hitherto known ionic liquid commonly includes an organic group in order to be in a liquid state at normal temperature and has a risk of combustion, although it is low in the flammability. Therefore, it is discovered that a risk of igniting-firing of the electrolyte cannot be sufficiently reduced even if the hitherto known ionic liquid is added. Further, it is discovered that the ionic liquid has a relatively high viscosity as the electrolyte of the electric double layer capacitor and there is a problem that low-temperature characteristics are insufficient or a capacitor performance at a high-rate discharge is insufficient in the electric double layer capacitor using the ionic liquid as an electrolyte.

It is, therefore, the first object of the invention to provide a safe non-aqueous electrolyte for a battery having no risk of igniting-firing and a non-aqueous electrolyte battery comprising such an electrolyte and having a high safety. Also, it is the second object of the invention to provide an electrolyte for an electric double layer capacitor being low in a risk of combustion and capable of improving the low-temperature characteristics and capacitor performance at the high-rate discharge of the electric double layer capacitor and an electric double layer capacitor comprising such an electrolyte, having a high safety and being excellent in the low-temperature characteristics and high-rate discharge performance.

The inventors have made various studies in order to achieve the above first objects and discovered that the risk of combustion of the non-aqueous electrolyte can be significantly reduced by adding an ionic liquid containing phosphorus and nitrogen in its cation portion to the electrolyte or making up the electrolyte only from the ionic liquid and a supporting salt and the safety of the non-aqueous electrolyte battery is highly improved by applying the electrolyte to the non-aqueous electrolyte battery, and as a result the invention has been accomplished.

That is, the non-aqueous electrolyte for the battery according to the invention comprises an ionic liquid composed of a cation portion and an anion portion, and a supporting salt, and is characterized in that the cation portion of the ionic liquid contains phosphorus and nitrogen. Also, the non-aqueous electrolyte battery according to the invention is characterized by comprising the non-aqueous electrolyte for the battery, a positive electrode and a negative electrode.

The non-aqueous electrolyte for the battery according to the invention preferably consists of the ionic liquid and the supporting salt.

The non-aqueous electrolyte for the battery according to the invention may further comprise an aprotic organic solvent. When the non-aqueous electrolyte for the battery according to the invention comprises the aprotic organic solvent, the non-aqueous electrolyte for the battery preferably comprises not less than 5% by volume of the ionic liquid.

In a preferable embodiment of the non-aqueous electrolyte for the battery according to the invention, the cation portion of the ionic liquid has a phosphorus-nitrogen double bond. As the ionic liquid having the phosphorus-nitrogen double bond in its cation portion is particularly preferable an ionic liquid represented by the following general formula (I):

$$(NPR^1{}_2)_n \quad (I)$$

[wherein R$^1$s are independently a halogen element or a monovalent substituent, provided that at least one of R$^1$s is an ionic substituent represented by the following general formula (II):

$$—N^+R^2{}_3X^- \quad (II)$$

(wherein R$^2$s are independently a monovalent substituent or hydrogen, provided that at least one of R$^2$s is not hydrogen and R$^2$s may be bonded with each other to form a ring; and X$^-$ is a monovalent anion); and n is 3 to 15]. Moreover, n in the general formula (I) is preferable to be 3 or 4, and it is preferable that at least one of R$^1$s in the general formula (I) is the ionic substituent represented by the general formula (II) and the other is fluorine.

Further, the inventors have made various studies in order to achieve the above second objects and discovered that the risk of combustion of the electrolyte can be significantly reduced by adding an ionic liquid containing phosphorus and nitrogen in its cation portion to the electrolyte or making up the electrolyte only from the ionic liquid and the low-temperature characteristics and capacitor performance at the high-rate discharge of the electric double layer capacitor are highly improved by applying the electrolyte to the electric double layer capacitor, and as a result the invention has been accomplished.

That is, the electrolyte for the electric double layer capacitor according to the invention comprises an ionic liquid composed of a cation portion and an anion portion, and is characterized in that the cation portion of the ionic liquid contains phosphorus and nitrogen. Also, the electric double layer capacitor according to the invention is characterized by comprising the electrolyte for the electric double layer capacitor, a positive electrode and a negative electrode.

The electrolyte for the electric double layer capacitor according to the invention preferably consists of the ionic liquid.

In a preferable embodiment of the electrolyte for the electric double layer capacitor according to the invention, the cation portion of the ionic liquid has a phosphorus-nitrogen double bond. As the ionic liquid having the phosphorus-nitrogen double bond in its cation portion is particularly preferable the ionic liquid represented by the general formula (I). Further, n in the general formula (I) is preferable to be 3 or 4, and it is preferable that at least one of less in the general formula (I) is the ionic substituent represented by the general formula (II) and the other is fluorine.

According to the invention, there can be provided a non-aqueous electrolyte for a battery comprising an ionic liquid containing phosphorus and nitrogen in its cation portion and being low in the risk of combustion. Also, there can be provided a non-aqueous electrolyte battery comprising such an electrolyte and having a high safety.

According to the invention, there can be further provided an electrolyte for an electric double layer capacitor comprising an ionic liquid containing phosphorus and nitrogen in its cation portion, being low in the risk of combustion and capable of improving the low-temperature characteristics and capacitor performance at the high-rate discharge of the electric double layer capacitor. Also, there can be provided an electric double layer capacitor comprising such an electrolyte, having a high safety and being excellent in the low-temperature characteristics and high-rate discharge performance.

BEST MODE FOR CARRYING OUT THE INVENTION

<Non-Aqueous Electrolyte for Battery>

Figure 1:
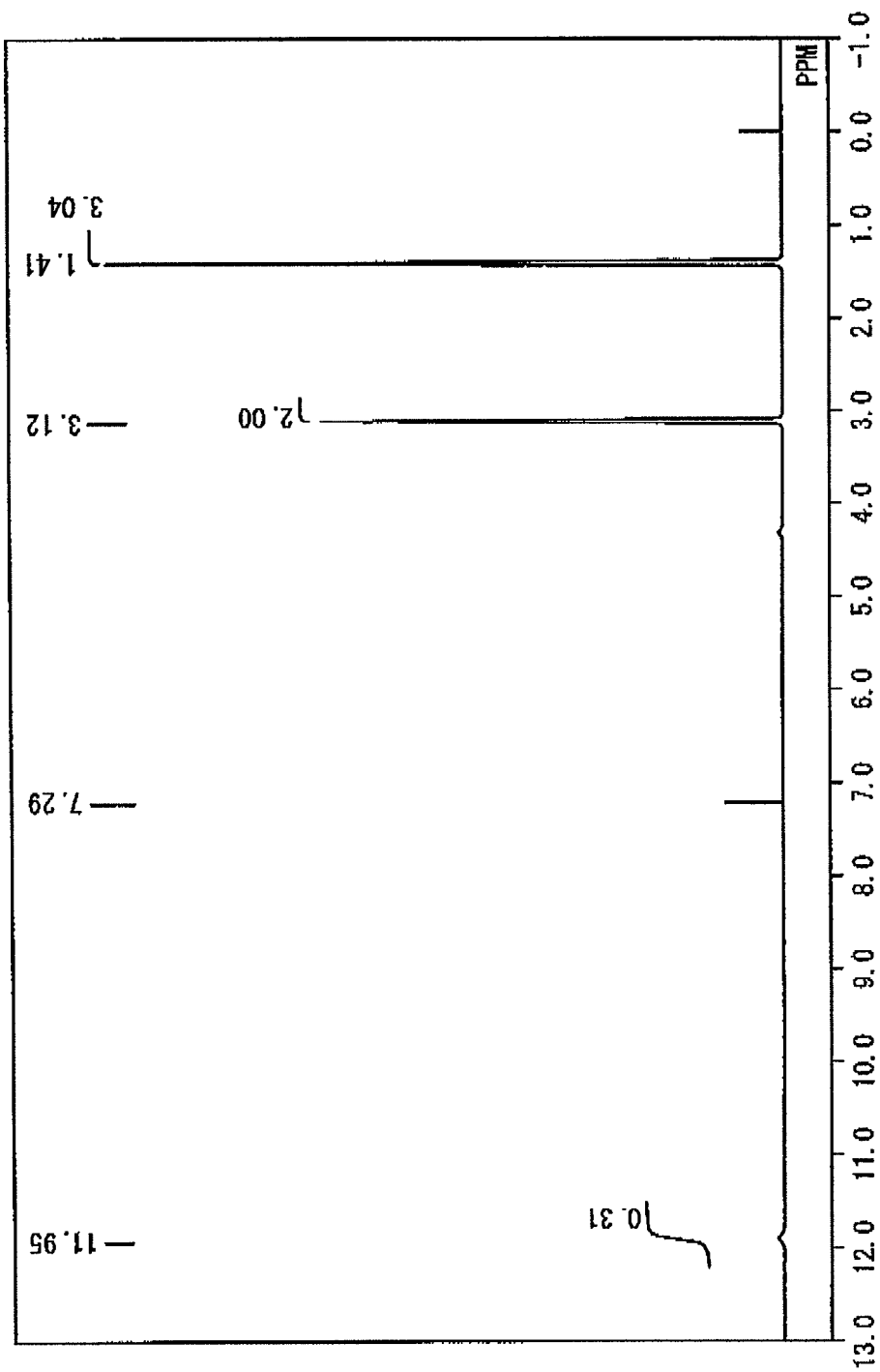
FIG. 1 is a result of $^1$H-NMR for a product obtained in the synthesis example 1 of the ionic liquid.

The non-aqueous electrolyte for the battery according to the invention will be described in detail below. The non-aqueous electrolyte for the battery according to the invention comprises an ionic liquid composed of a cation portion and an anion portion, and a supporting salt, and is characterized in that the cation portion of the ionic liquid contains phosphorus and nitrogen. The cation portion of the ionic liquid included in the non-aqueous electrolyte for the battery of the invention is decomposed to generate a nitrogen gas, a phosphate ester and the like, and can effectively reduce the risk of igniting-firing of the battery because the risk of combustion of the electrolyte is reduced by an action of the generated nitrogen gas and chain decomposition of a macromolecular material constituting the battery is suppressed by an action of the generated phosphate ester or the like. Further, when the cation portion of the ionic liquid contains a halogen, the halogen acts as an active radical catching agent in an accidental combustion to decrease the risk of combustion of the electrolyte. Furthermore, when the cation portion of the ionic liquid contains an organic substituent, it has an effect of shielding oxygen because it forms a carbide (char) on a separator in the combustion.

The ionic liquid constituting the non-aqueous electrolyte for the battery of the invention has a melting point of not higher than 50° C., preferably not higher than 20° C. The ionic liquid is composed of the cation portion and the anion portion, and the cation portion is bonded with the anion portion through an electrostatic attraction. As the ionic liquid is preferable an ionic compound having a phosphorus-nitrogen double bond in its cation portion, and the ionic compound represented by the general formula (I) is more preferable.

The compound of the general formula (I) has a high combustion inhibiting effect because it is a kind of a cyclic phosphazene compound having a plurality of phosphorus-nitrogen double bonds, and it also has an ionic characteristic because at least one of $R^1$s is the ionic substituent of the formula (II).

In the general formula (I), $R^1$s are independently a halogen element or a monovalent substituent, provided that at least one of $R^1$s is the ionic substituent represented by the general formula (II). As the halogen element in $R^1$ are preferably mentioned fluorine, chlorine, bromine and the like. Among them, fluorine is particularly preferable. As the monovalent substituent in $R^1$ are mentioned an alkoxy group, an alkyl group, an aryloxy group, an aryl group, a carboxyl group, an acyl group and the like. As the alkoxy group are mentioned methoxy group, ethoxy group, methoxy ethoxy group, propoxy group, allyloxy group and vinyloxy group containing a double bond, an alkoxy-substituted alkoxy group such as methoxy ethoxy group, methoxy ethoxy ethoxy group or the like, and so on. As the alkyl group are mentioned methyl group, ethyl group, propyl group, butyl group, pentyl group and the like. As the aryloxy group are mentioned phenoxy group, methylphenoxy group, methoxy phenoxy group and the like. As the aryl group are mentioned phenyl group, tolyl group, naphthyl group and the like. As the acyl group are mentioned formyl group, acetyl group, propionyl group, butylyl group, isobutylyl group, valeryl group and the like. In these monovalent substituents, a hydrogen element is preferably substituted with a halogen element and as the halogen element are preferably mentioned fluorine, chlorine, bromine and the like.

In the general formula (I), n is 3 to 15, preferably 3 to 4, most preferably 3 in view of an availability of the starting material.

The substituent represented by the general formula (II) is formed by bonding —$NR^2_3$ with X mainly through an electrostatic attraction. Therefore, the ionic compound of the formula (I) having the ionic substituent of the formula (II) has an ionic characteristic.

In the general formula (II), $R^2$s are independently a monovalent substituent or hydrogen, provided that at least one of $R^2$s is not hydrogen and $R^2$s may be bonded with each other to form a ring. As the monovalent substituent in $R^2$ are mentioned an alkyl group, an aryl group and the like. As the alkyl group are mentioned methyl group, ethyl group, propyl group, butyl group, pentyl group and the like. As the aryl group are mentioned phenyl group, tolyl group, naphthyl group and the like. When the plural $R^2$s are bonded with each other to form a ring, as a ring formed by bonding any two of three $R^2$s are mentioned azacycloalkane rings such as an aziridine ring, an azetidine ring, a pyrrolidine ring, a piperidie ring and so on, and azacycloalkanone rings having a structure formed by substituting a methylene group in the azacycloalkane ring with a carbonyl group, and as a ring formed by bonding three $R^2$s are mentioned a pyridine ring and so on. In these monovalent substituents, a hydrogen element may be substituted with a halogen element or the like.

In the general formula (II), $X^-$ is the monovalent anion. As the monovalent anion in $X^-$ of the formula (II) are mentioned $F^-$, $Cl^-$, $Br^-$, $I^-$, $BF_4^-$, $PF_6^-$, $AsF_6^-$, $SbF_6^-$, $CF_3SO_3^-$, $(CF_3SO_2)_2N^-$, $(C_2F_5SO_2)_2N^-$, $(C_3F_7SO_2)_2N^-$, $(CF_3SO_2)(C_2F_5SO_2)N^-$, $(CF_3SO_2)(C_3F_7SO_2)N^-$, $(C_2F_5SO_2)(C_3F_7SO_2)N^-$ and so on, In the ionic compound of the formula (I), at least one of $R^1$s is the ionic substituent represented by the general formula (II) and the other is preferable to be fluorine in view of the non-combustibility of the ionic compound.

The production method of the ionic compound is not particularly limited. For example, a cyclic phosphazene compound represented by the following general formula (III):

$$(NPR^3_2)_n \qquad \text{(III)}$$

[wherein $R^3$s are independently a halogen element or a monovalent substituent, provided that at least one of $R^3$s is chlorine; and n is 3 to 15] can be reacted with a primary, secondary or tertiary amine represented by the following general formula (IV):

$$NR^2_3 \qquad \text{(IV)}$$

[wherein $R^2$s are the same meaning as mentioned above] to produce an ionic compound represented by the following general formula (V):

$$(NPR^4_2)_n \qquad \text{(V)}$$

[wherein $R^4$s are independently a halogen element or a monovalent substituent, provided that at least one of $R^4$s is an ionic substituent represented by the following general formula (VI):

$$-N^+R^2_3Cl^- \qquad \text{(VI)}$$

(wherein $R^2$s are the same meaning as mentioned above); and n is the same meaning as mentioned above] (that is, an ionic compound represented by the general formula (I) wherein $X^-$ in the formula (II) is $Cl^-$).

Further, the chlorine ion in the ionic compound represented by the general formula (V) can be substituted with another monovalent anion, if necessary. For example, the ionic compound represented by the general formula (V) can be reacted (subjected to an ion-exchange reaction) with a salt (ion-exchange agent) represented by the following general formula (VII):

$$A^+X^- \quad (VII)$$

[wherein $A^+$ is a monovalent cation and $X^-$ is a monovalent anion] to produce the ionic compound represented by the general formula (I).

Although the ionic compound represented by the general formula (V) can be produced by only mixing the cyclic phosphazene compound represented by the general formula (III) with the amine represented by the general formula (IV), the resulting ionic compound of the formula (V) may be unstable and hardly isolated. Therefore, it is preferable that the cyclic phosphazene compound represented by the general formula (III) and the amine represented by the general formula (IV) are added to a two-phase system composed of a water phase and an organic phase and reacted to produce the ionic compound represented by the general formula (V). In this method, the cyclic phosphazene compound of the formula (III) and the amine of the formula (IV) mainly exist in the organic phase, while the resulting ionic compound of the formula (V) mainly exists in the water phase because it has an ionic characteristic. Therefore, the water phase is separated from the organic phase and then the water in the water phase can be dried according to a known method to isolate the ionic compound of the formula (V), and the isolated ionic compound of the formula (V) stably exists under atmosphere.

In the general formula (III), $R^3$s are independently a halogen element or a monovalent substituent, provided that at least one of $R^3$s is chlorine. The amine of the formula (IV) is attached to the portion where $R^3$ in the formula (III) is chlorine. Therefore, the number of the ionic substituent represented by the formula (VI) and introduced into the ionic compound of the formula (V) can be controlled by adjusting the number of the chlorine bonded with the phosphorus in the skeleton of the cyclic phosphazene compound of the formula (III) as a starting material.

In the $R^3$ of the general formula (III), as the halogen element are preferably mentioned fluorine, bromine and the like as well as chlorine. Among them, chlorine and fluorine are particularly preferable. On the other hand, as the monovalent substituent in $R^3$ are mentioned the same ones as described in the section of the monovalent substituent in $R^1$. Further, n in the formula (III) is 3 to 15, preferably 3 to 4, most preferably 3 in view of an availability.

The cyclic phosphazene compound represented by the general formula (III) can be synthesized, for example, by a method wherein a commercially available phosphazene compound in which all $R^3$s in the formula (III) are chlorine is used as a starting material and all chlorines are fluorinated with a fluorinating agent and then an alkoxy group, an amine group or the like is introduced into a target position to be substituted with chlorine and thereafter the chlorination is again conducted with a chlorinating agent such as HCl, phosgene or the like, a method wherein after equivalent weight of fluorine to be introduced into the commercial phosphazene compound in which all $R^3$s in the formula (III) are chlorine is calculated, a necessary amount of a fluorinating agent is added, and so on. The number of the chlorine in the $R^3$s of the formula (III) can be controlled by varying the amount of the chlorinating agent used during the rechlorination or the fluorinating agent used during the fluorination or reaction conditions.

In the general formula (IV), $R^2$s have the same meaning as $R^2$s in the general formula (II) and are independently a monovalent substituent or hydrogen, provided that at least one of $R^2$s is not hydrogen and $R^2$s may be bonded with each other to form a ring. As the monovalent substituent in $R^2$ of the formula (IV) are mentioned the same ones as described in the section of the monovalent substituent in $R^2$ of the formula (II). As a ring formed by bonding any two of three $R^2$s and a ring formed by bonding three $R^2$s in the formula (IV) are mentioned the same ones as described in the section of the ring formed by bonding any two of three $R^2$s and the ring formed by bonding three $R^2$s in the formula (II). As the amine represented by the formula (IV) are concretely mentioned aliphatic tertiary amines such as trimethylamine, triethylamine, tripropylamine, tributylamine and so on, cyclic tertiary amines such as N-methyl-2-pyrrolidone, N-ethyl-2-pyrrolidone and so on, aromatic tertiary amines such as dialkyl-substituted anilines including dimethylaniline, pyridine and so on, aromatic primary amines such as aniline and so on. Among them, the tertiary amines are preferable.

In the general formula (V), $R^4$s are independently a halogen element or a monovalent substituent, provided that at least one of $R^4$s is the ionic substituent represented by the general formula (VI). As the halogen element in $R^4$ are mentioned fluorine, chlorine, bromine and so on. A part of $R^4$s can be chlorine by adjusting the amount of the amine of the formula (IV) used or the like. On the other hand, as the monovalent substituent in $R^4$ are mentioned the same ones as described in the section of the monovalent substituent in $R^1$. Further, n in the formula (V) is 3 to 15, preferably 3 to 4, most preferably 3 in view of an availability of the starting material.

In the general formula (VI), $R^2$s have the same meaning as $R^2$s in the general formula (II) and are independently a monovalent substituent or hydrogen, provided that at least one of $R^2$s is not hydrogen and $R^2$s may be bonded with each other to form a ring. As the monovalent substituent in $R^2$ of the formula (VI) are mentioned the same ones as described in the section of the monovalent substituent in $R^2$ of the formula (II). As a ring formed by bonding any two of three $R^2$s and a ring formed by bonding three $R^2$s in the formula (VI) are mentioned the same ones as described in the section of the ring formed by bonding any two of three $R^2$s and the ring formed by bonding three $R^2$s in the formula (II).

In the production of the ionic compound of the formula (V), the amount of the amine of the formula (IV) used can be properly selected depending on the target amount of the amine introduced and, for example, it is preferably within a range of 1 to 2.4 mol per 1 mol of chlorine in $R^3$ of the cyclic phosphazene compound of the formula (III).

The reaction temperature during the reaction of the cyclic phosphazene compound of the formula (III) with the amine of the formula (IV) is not particularly limited, but is preferably within a range of 20° C. to 80° C. and the reaction sufficiently progresses at room temperature. Also, the reaction pressure is not particularly limited, and the reaction can be carried out under atmospheric pressure.

In the two-phase system composed of the water phase and the organic phase, as an organic solvent used in the organic phase is preferable one not having a miscibility with water and capable of dissolving the cyclic phosphazene compound of the formula (III) and the amine of the formula (IV), and concretely low-polar solvents such as chloroform, toluene and so on are preferable. The amounts of the water phase and the organic phase used are not particularly limited, but the volume of the water phase is preferably within a range of 0.2 to 5 mL per 1 mL of the cyclic phosphazene compound of the formula (III) and the volume of the organic phase is preferably within a range of 2 to 5 mL per 1 mL of the cyclic phosphazene compound of the formula (III).

In the general formula (VII), $A^+$ is the monovalent cation and $X^-$ is the monovalent anion. As the monovalent cation in $A^+$ of the formula (VII) are mentioned $Ag^+$, $Li^+$ and so on. As the monovalent anion in X' of the formula (VII) are mentioned monovalent anions except $Cl^-$ and are concretely mentioned $BF_4^-$, $PF_6^-$, $AsF_6^-$, $SbF_6^-$ and $CF_3SO_3^-$, as well as imide ions such as $(CF_3SO_2)_2N^-$, $(C_2F_5SO_2)_2N^-$, $(C_3F_7SO_2)_2N^-$, $(CF_3SO_2)(C_2F_5SO_2)N^-$, $(CF_3SO_2)(C_3F_7SO_2)N^-$, $(C_2F_5SO_2)(C_3F_7SO_2)N^-$ and so on. When $A^+$ is $Li^+$, the imide ions are preferable as $X^-$. This is because the imide ion has a large ionic radius as contrasted with $Li^+$ having a small ionic radius and thereby it is well reacted due to a difference in the ionic radius between the cation and the anion (hard/soft-acid/base principle) and a substitution reaction progresses well. On the other hand, when $A^+$ is $Ag^+$, almost every anion can be used. When $Ag^+X^-$ is used as the salt of the formula (VII), AgCl settles out so that it is also easy to remove impurity.

In the production of the ionic compound of the formula (I), the amount of the salt of the formula (VII) used can be properly selected depending on the amount of the chlorine ion in the ionic compound of the formula (V) and, for example, it is preferably within a range of 1 to 1.5 mol per 1 mol of the chlorine ion in the ionic compound of the formula (V).

Further, the reaction temperature during the reaction of the ionic compound of the formula (V) with the salt of the formula (VII) is not particularly limited, but is preferably within a range of room temperature to 50° C. and the reaction sufficiently progresses at room temperature. Also, the reaction pressure is not particularly limited, and the reaction can be carried out under atmospheric pressure.

The reaction of the ionic compound of the formula (V) with the salt of the formula (VII) is preferably carried out in a water phase. When the ionic compound of the formula (V) is reacted with a silver salt represented by the formula (VII) wherein $A^+$ is $Ag^+$, silver chloride is produced as a by-product and the silver chloride has a very low solubility in water. Therefore, when the reaction is carried out in the water phase, it is easy to remove the by-product. The isolation of the ionic compound of the formula (I) as the target compound from the water phase may be conducted by evaporating the water in the water phase according to a known method. The volume of the water phase is not particularly limited, but is preferably within a range of 2 to 5 mL per 1 mL of the ionic compound of the formula (V).

As the supporting salt used in the non-aqueous electrolyte for the battery of the invention is preferable a supporting salt serving as an ion source for a lithium ion. The supporting salt is not particularly limited, but preferably includes lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and so on. These supporting salts may be used alone or in a combination of two or more. The concentration of the supporting salt in the non-aqueous electrolyte for the battery of the invention is preferably within a range of 0.2 to 1.5 mol/L (M), more preferably 0.5 to 1 mol/L. When the concentration of the supporting salt is less than 0.2 mol/L, the electric conductivity of the electrolyte cannot be sufficiently ensured and troubles may be caused in the discharge property and the charge property of the battery, while when it exceeds 1.5 mol/L, the viscosity of the electrolyte rises and the sufficient mobility of the lithium ion cannot be ensured, and hence the sufficient electric conductivity of the electrolyte cannot be ensured and troubles may be caused in the discharge property and the charge property of the battery likewise the above-mentioned case.

The non-aqueous electrolyte for the battery of the invention preferably consists of the ionic liquid and the supporting salt, but may contain a known additive or the like commonly used in the non-aqueous electrolyte for the battery for any purpose. In particular, the non-aqueous electrolyte for the battery of the invention can contain an aprotic organic solvent. As the aprotic organic solvent are preferably mentioned esters such as dimethyl carbonate (DMC), diethyl carbonate (DEC), diphenyl carbonate, ethyl methyl carbonate (EMC), ethylene carbonate (EC), propylene carbonate (PC), γ-butyrolactone (GBL), γ-valerolactone, methyl formate (MF) and so on; and ethers such as 1,2-dimethoxy ethane (DME), tetrahydrofuran (THF) and so on. Among them, propylene carbonate, 1,2-dimethoxy ethane and γ-butyrolactone are preferable as an aprotic organic solvent for the non-aqueous electrolyte of the primary battery, and ethylene carbonate, propylene carbonate, diethyl carbonate, dimethyl carbonate, ethyl methyl carbonate and methyl formate are preferable as an aprotic organic solvent for the non-aqueous electrolyte of the secondary battery. Moreover, cyclic esters are preferable in a point that the dielectric constant is high and the solubility of the supporting salt is excellent, while chain esters and chain ethers are preferable in a point that they has a low viscosity and the viscosity of the electrolyte is made low. These aprotic organic solvents may be used alone or in a combination of two or more. In this connection, the content of the ionic liquid in the electrolyte is preferable to be not less than 5% by volume in view of the safety of the electrolyte.

<Non-Aqueous Electrolyte Battery>

Then, the non-aqueous electrolyte battery according to the invention will be described in detail. The non-aqueous electrolyte battery of the invention comprises the above-mentioned non-aqueous electrolyte for the battery, a positive electrode and a negative electrode, and may be provided with other members usually used in the technical field of the non-aqueous electrolyte battery such as a separator and the like, if necessary, and may be a primary battery or a secondary battery.

Active materials for the positive electrode in the non-aqueous electrolyte battery of the invention partly differ between the primary battery and the secondary battery. For example, as the active material for the positive electrode of the non-aqueous electrolyte primary battery are preferably mentioned graphite fluoride [$(CF_x)_n$], $MnO_2$, (which may be synthesized electrochemically or chemically), $V_2O_5$, $MoO_3$, $Ag_2CrO_4$, $CuO$, $CuS$, $FeS_2$, $SO_2$, $SOCl_2$, $TiS_2$ and the like. Among them, $MnO_2$ and graphite fluoride are preferable because they are high in the capacity and the safety, high in the discharge potential and excellent in the wettability to the electrolyte. These active materials for the positive electrode may be used alone or in a combination of two or more.

On the other hand, as the active material for the positive electrode of the non-aqueous electrolyte secondary battery are preferably mentioned metal oxides such as $V_2O_5$, $V_6O_{13}$, $MnO_2$, $MnO_3$ and the like; lithium-containing composite oxides such as $LiCoO_2$, $LiNiO_2$, $LiMn_2O_4$, $LiFeO_2$, $LiFePO_4$ and the like; metal sulfides such as $TiS_2$, $MoS_2$ and the like; electrically conductive polymers such as polyaniline and the like. The lithium-containing composite oxide may be a composite oxide containing two or three transition metals selected from the group consisting of Fe, Mn, Co and Ni. In this case, the composite oxide is represented by $LiFe_xCo_yNi_{(1-x-y)}O_2$ (wherein $0 \leq x < 1$, $0 \leq y < 1$, $0 < x+y \leq 1$), $LiMn_xFe_yO_{2-x-y}$ or the like. Among them, $LiCoO_2$, $LiNiO_2$ and $LiMn_2O_4$ are particularly preferable because they are high in the capacity, high in the safety and excellent in the wettability to the electrolyte. These active materials for the positive electrode may be used alone or in a combination of two or more.

Active materials for the negative electrode in the non-aqueous electrolyte battery of the invention partly differ between the primary battery and the secondary battery. For example, as the active material for the negative electrode of the non-aqueous electrolyte primary battery are mentioned lithium metal itself, lithium alloys and the like. As a metal to be alloyed with lithium are mentioned Sn, Pb, Al, Au, Pt, In, Zn, Cd, Ag, Mg and the like. Among them, Al, Zn and Mg are preferable from a viewpoint of toxicity and an abundance of a deposit amount. These active materials for the negative electrode may be used alone or in a combination of two or more.

On the other hand, as the active material for the negative electrode of the non-aqueous electrolyte secondary battery are preferably mentioned lithium metal itself, an alloy of lithium with Al, In, Sn, Si, Pb, Zn or the like, a carbonaceous material such as graphite doped with lithium, and the like. Among them, the carbonaceous material such as graphite or the like is preferable and graphite is particularly preferable in a point that the safety is higher and the wettablility of the electrolyte is excellent. As the graphite are mentioned natural graphite, artificial graphite, mesophase carbon micro bead (MCMB) and so on, further mentioned graphitizable carbon and non-graphitizable carbon. These active materials for the negative electrode may be used alone or in a combination of two or more.

The positive electrode and the negative electrode may be mixed with an electrically conducting agent and a binding agent, if necessary. As the electrically conducting agent are mentioned acetylene black and the like, and as the binding agent are mentioned polyvinylidene fluoride (PVDF), polytetrafluoroethylene (PTFE), styrene-butadiene rubber (SBR), carboxymethyl cellulose (CMC) and the like. These additives may be compounded in the same compounding ratio as in the conventional case.

The forms of the positive and negative electrodes are not particularly limited, but can be properly selected from the well-known forms as the electrode. For example, there are mentioned a sheet form, a column form, a plate form, a spiral form and the like.

As the other member used in the non-aqueous electrolyte battery of the invention is mentioned a separator interposed between the positive and negative electrodes in the non-aqueous electrolyte battery and acting to prevent short-circuiting of current due to the contact between the electrodes. As a material of the separator are preferably mentioned materials capable of surely preventing the contact between the electrodes and passing or impregnating the electrolyte such as non-woven fabrics, thin-layer films and the like made of synthetic resin such as polytetrafluoroethylene, polypropylene, polyethylene, cellulose based resin, polybutylene terephthalate, polyethylene terephthalate or the like. Among them, a microporous film having a thickness of about 20-50 μm and made of polypropylene or polyethylene, and a film made of cellulose based resin, polybutylene terephthalate, polyethylene terephthalate or the like are particularly preferable. In the invention, various well-known members usually used in the battery can be preferably used in addition to the above-mentioned separator.

The form of the above non-aqueous electrolyte battery according to the invention is not particularly limited, but there are preferably mentioned various well-known forms such as coin type, button type, paper type, cylindrical type of polygonal form or spiral structure and so on. In case of the button type, the non-aqueous electrolyte battery can be made by preparing sheet-shaped positive and negative electrodes and sandwiching the separator between the positive and negative electrodes. Also, in case of the spiral structure, the non-aqueous electrolyte battery can be made by preparing a sheet-shaped positive electrode, sandwiching between collectors, piling the sheet-shaped negative electrode thereon and then winding them or the like.

<Electrolyte for Electric Double Layer Capacitor>

Then, the electrolyte for the electric double layer capacitor according to the invention will be described in detail below. The electrolyte for the electric double layer capacitor according to the invention comprises an ionic liquid composed of a cation portion and an anion portion, and is characterized in that the cation portion of the ionic liquid contains phosphorus and nitrogen. In the electrolyte for the electric double layer capacitor of the invention, the ionic liquid serves as an ion source for forming an electric double layer, so that it is not necessary to add an additional supporting salt. Further, the electrolyte for the electric double layer capacitor of the invention can improve the low-temperature characteristics of the capacitor because it has a relatively low viscosity, and can also improve the high-rate discharge performance of the capacitor because the number of the ion carrier in the electrolyte is very large, an ion mobility is high even at normal temperature and an ion conductivity is very high.

Furthermore, the cation portion of the ionic liquid included in the electrolyte for the electric double layer capacitor of the invention is decomposed to generate a nitrogen gas, a phosphate ester and the like, and can effectively reduce the risk of igniting-firing of the capacitor because the risk of combustion of the electrolyte is reduced by au action of the generated nitrogen gas and chain decomposition of a macromolecular material constituting the capacitor is suppressed by an action of the generated phosphate ester or the like. Moreover, when the cation portion of the ionic liquid contains a halogen, the halogen acts as an active radical catching agent in an accidental combustion to decrease the risk of combustion of the electrolyte. In addition, when the cation portion of the ionic liquid contains an organic substituent, it has an effect of shielding oxygen because it forms a carbide (char) on a separator in the combustion.

The ionic liquid constituting the electrolyte for the electric double layer capacitor of the invention has a melting point of not higher than 50° C., preferably not higher than 20° C. The ionic liquid is composed of the cation portion and the anion portion, and the cation portion is bonded with the anion portion through an electrostatic attraction. As the ionic liquid is preferable an ionic compound having a phosphorus-nitrogen double bond in its cation portion, and the ionic compound represented by the general formula (I) and described in detail in the section of the non-aqueous electrolyte for the battery is more preferable.

The electrolyte for the electric double layer capacitor of the invention preferably consists of the ionic liquid, but may contain a known additive or the like commonly used in the electrolyte for the electric double layer capacitor for any purpose. In this connection, the content of the ionic liquid in the electrolyte is preferable to be not less than 3% by volume in view of the safety of the electrolyte.

<Electric Double Layer Capacitor>

Then, the electric double layer capacitor of the invention will be described in detail. The electric double layer capacitor according to the invention comprises the electrolyte, a positive electrode and a negative electrode, and may be provided with other members usually used in the technical field of the electric double layer capacitor such as a separator and the like, if necessary. The electric double layer capacitor according to the invention comprises the above-mentioned electrolyte containing the ionic liquid, so that it is high in the safety and excellent in the low-temperature characteristics and high-rate discharge performance.

The positive and negative electrodes of the electric double layer capacitor according to the invention are not particularly limited, but are preferable to be usually a porous carbon-based polarizable electrode. The electrode is usually preferable to have such properties that the specific surface area and bulk gravity are high and it is electrochemically inactive and the resistivity is low, and the like. As the porous carbon are preferably mentioned an active carbon and the like. As the positive and negative electrodes of the electric double layer capacitor according to the invention may be used a graphite as well as the porous carbon.

The electrode generally contains the porous carbon such as the active carbon or the like, and may contain other components such as an electrically conducting agent, a binding agent and the like, if necessary. The raw material of the active carbon preferably used as the electrode is not particularly limited, but preferably includes phenolic resin, various heat-resistant resins, pitch and the like. As the heat-resistant resin are preferably mentioned resins such as polyimide, polyamide, polyamideimide, polyether imide, polyether sulfone, polyether ketone, bismaleimide triazine, aramide, fluorine resin, polyphenylene, polyphenylene sulfide and the like. They may be used alone or in a combination of two or more. As the shape of the active carbon are preferable powder, fibrous cloth and the like from a point that the specific surface area is made higher to increase the capacitance of the electric double layer capacitor. Also, the active carbon may be subjected to a treatment such as heat treatment, drawing, high-temperature treatment under vacuum, rolling or the like for the purpose of increasing the capacitance of the electric double layer capacitor.

The electrically conducting agent used in the electrode is not particularly limited, but includes graphite, acetylene black and the like. Also, the binding agent used in the electrode is not particularly limited, but includes polyvinylidene fluoride (PVOF), polytetrafluoroethylene (PTFE), styrene-butadiene rubber (SBR), carboxymethyl cellulose (CMC) and the like.

The electric double layer capacitor according to the invention is preferable to comprise a separator, a collector, a container and the like in addition to the above-mentioned positive and negative electrodes and the electrolyte, and may be further provided with various known members usually used in the electric double layer capacitor. At this moment, the separator is interposed between the positive and negative electrodes for the purpose of preventing the short-circuiting of the electric double layer capacitor or the like. The separator is not particularly limited, but there are preferably used known separators usually used as a separator for the electric double layer capacitor. As the material of the separator are preferably mentioned microporous films, non-woven fabrics, papers and the like. Concretely, there are preferably mentioned non-woven fabrics, thin-layer films and the like made of synthetic resin such as polytetrafluoroethylene, polypropylene, polyethylene or the like. Among them, a microporous film of polypropylene or polyethylene having a thickness of about 20 to 50 μm is particularly preferable.

The collector is not particularly limited, but there are preferably used known ones usually used as a collector for the electric double layer capacitor. As the collector, it is preferable to be excellent in the electrochemically corrosion resistance, chemically corrosion resistance, workability, and mechanical strengths and low in the cost, and a collector layer made of aluminum, stainless steel, electrically conductive resin or the like is preferable.

The container is not particularly limited, but there are preferably mentioned known ones usually used as a container for the electric double layer capacitor. As the material of the container are preferable aluminum, stainless steel, electrically conductive resins and the like.

The shape of the electric double layer capacitor according to the invention is not particularly limited, but there are preferably mentioned various known shapes such as cylinder type (cylindrical shape, square shape), flat type (coin type) and the like. The electric double layer capacitor may be used as a main power source or an auxiliary power source for an electric automobile and a fuel cell vehicle, and as power sources for memory backup of various electronics, industrial instruments and airplane instruments and the like, for electromagnetic holding of toys, cordless equipments, gas equipments, flash water heaters and the like and for watches such as wrist watch, wall clock, solar watch, AGS wrist watch and the like.

EXAMPLES

The following examples are given in illustration of the invention and are not intended as limitations thereof.

Synthesis Example 1 of Ionic Liquid

Figure 2:
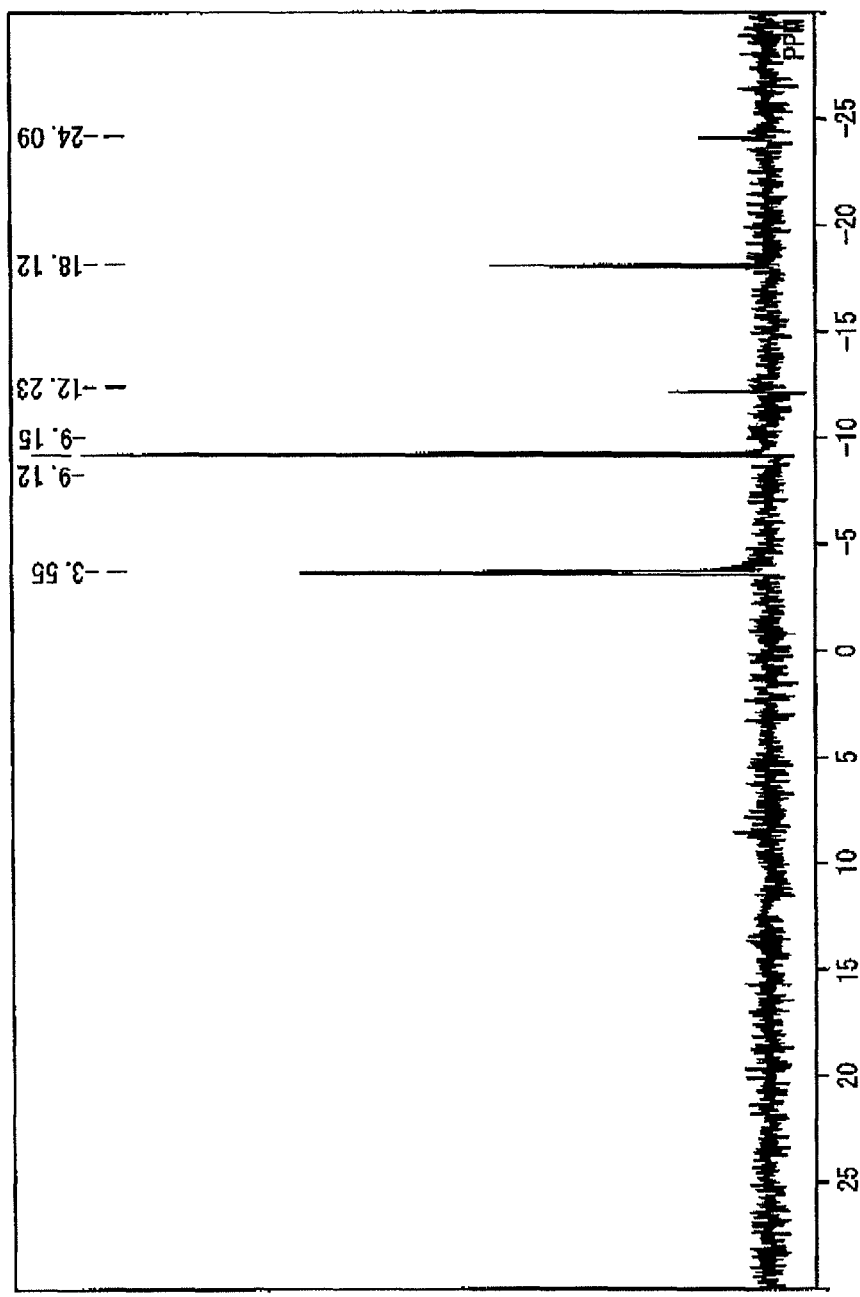
FIG. 2 is a result of $^{31}$P-NMR for the product obtained in the synthesis example 1 of the ionic liquid.
Figure 3:
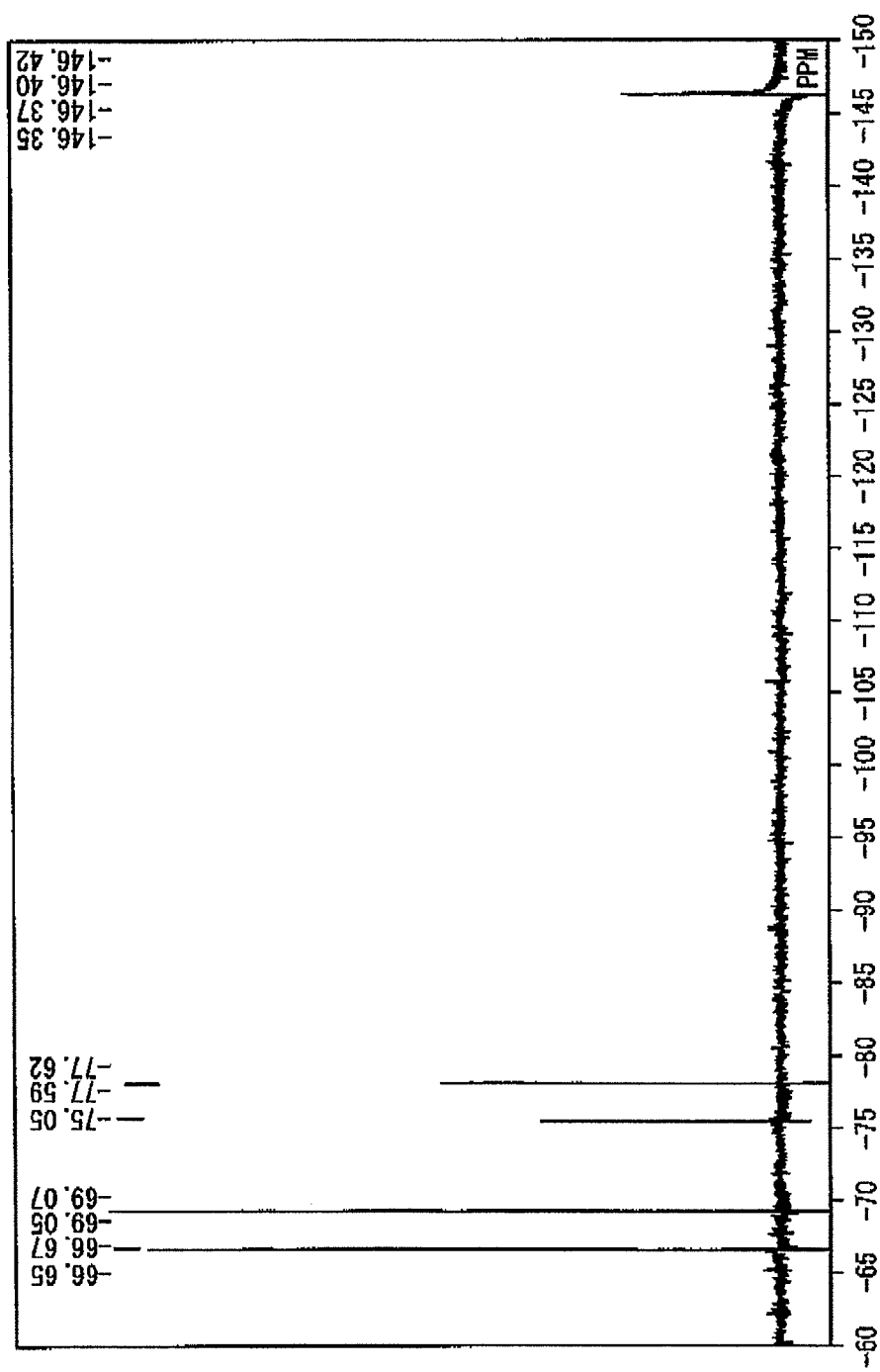
FIG. 3 is a result of $^{19}$F-NMR for the product obtained in the synthesis example 1 of the ionic liquid.

A two-phase system composed of 5 g of water and 5 g of chloroform is prepared, and to the two-phase system are sequentially added dropwise 5 mL of triethylamine and 5 mL of a cyclic phosphazene compound represented by the general formula (III) wherein n is 3, one of six $R^3$s is chlorine and five thereof are fluorine. The two-phase system is stirred with a stirrer and then heat generation is observed along with a reaction. After stirring for 3 minutes, a water phase is collected and water is evaporated to produce a white crystal. It is further dried under a reduced pressure to obtain 5.2 g of a white crystal (yield: 53%). Then, 2 g of the resulting white crystal and 2.2 g of $AgBF_4$ are dissolved in 20 mL of water and stirred for 30 minutes, and then a water phase is collected, water is evaporated and thereby a clear liquid remains. The clear liquid is further dried under a reduced pressure to obtain 1.8 g of an ionic liquid A (yield: 79%). The resulting ionic liquid A is dissolved in deuterium oxide and analyzed by $^1$H-NMR, $^{31}$P-NMR and $^{19}$F-NMR to confirm that the ionic liquid A is represented by the general formula (I) wherein n is 3, five of six $R^1$s are fluorine and one thereof is —$N^+(CH_2CH_2)_3BF_4^-$. The result of $^1$H-NMR for the product is shown in FIG. 1, the result of $^{31}$P-NMR for the product is shown in FIG. 2, the result of $^{19}$F-NMR for the product is shown in FIG. 3 and the reaction scheme is shown below.

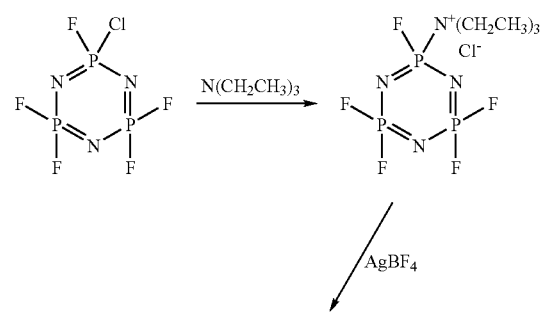

Reaction scheme 1

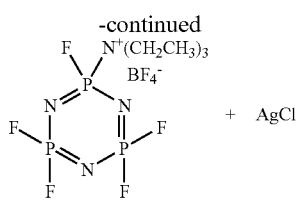

Synthesis Example 2 of Ionic Liquid

Figure 4:
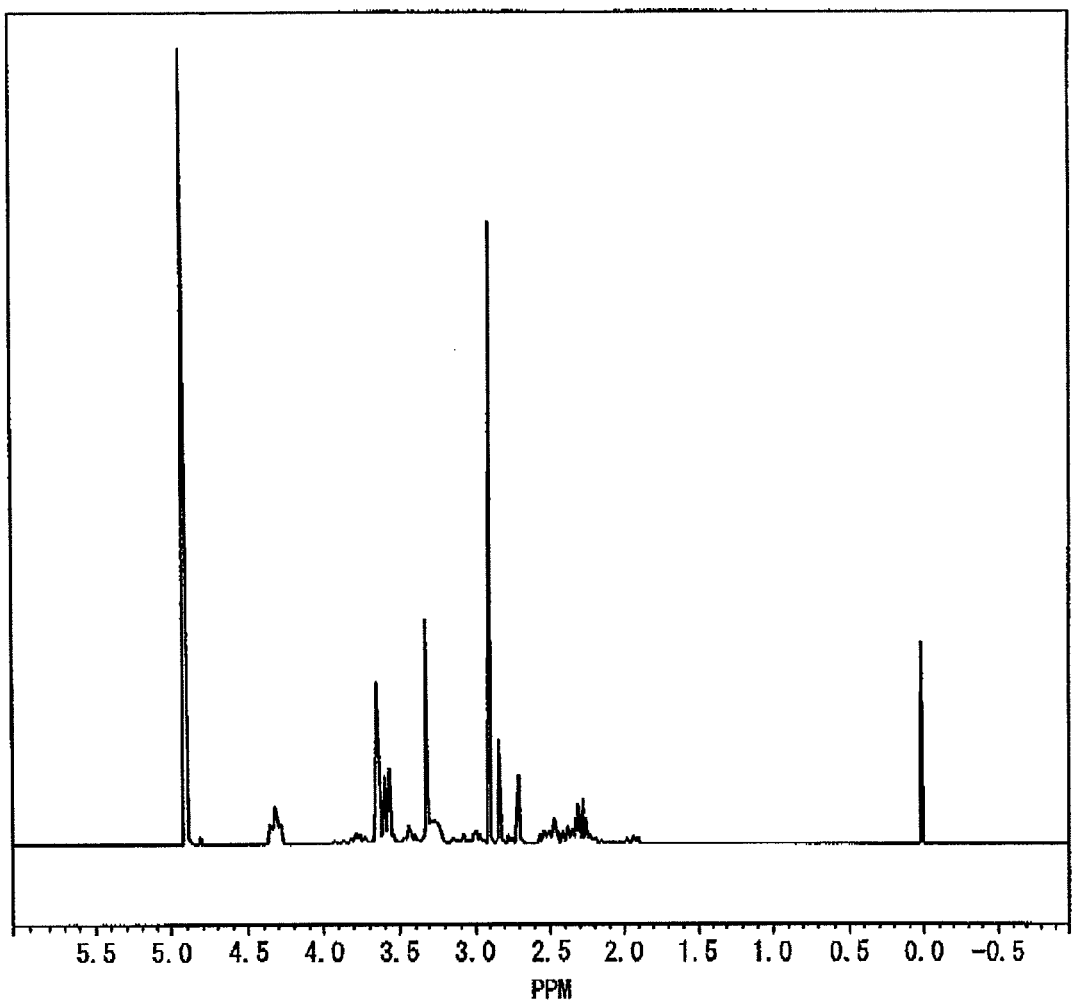
FIG. 4 is a result of $^1$H-NMR for a product obtained in the synthesis example 2 of the ionic liquid.
Figure 5:
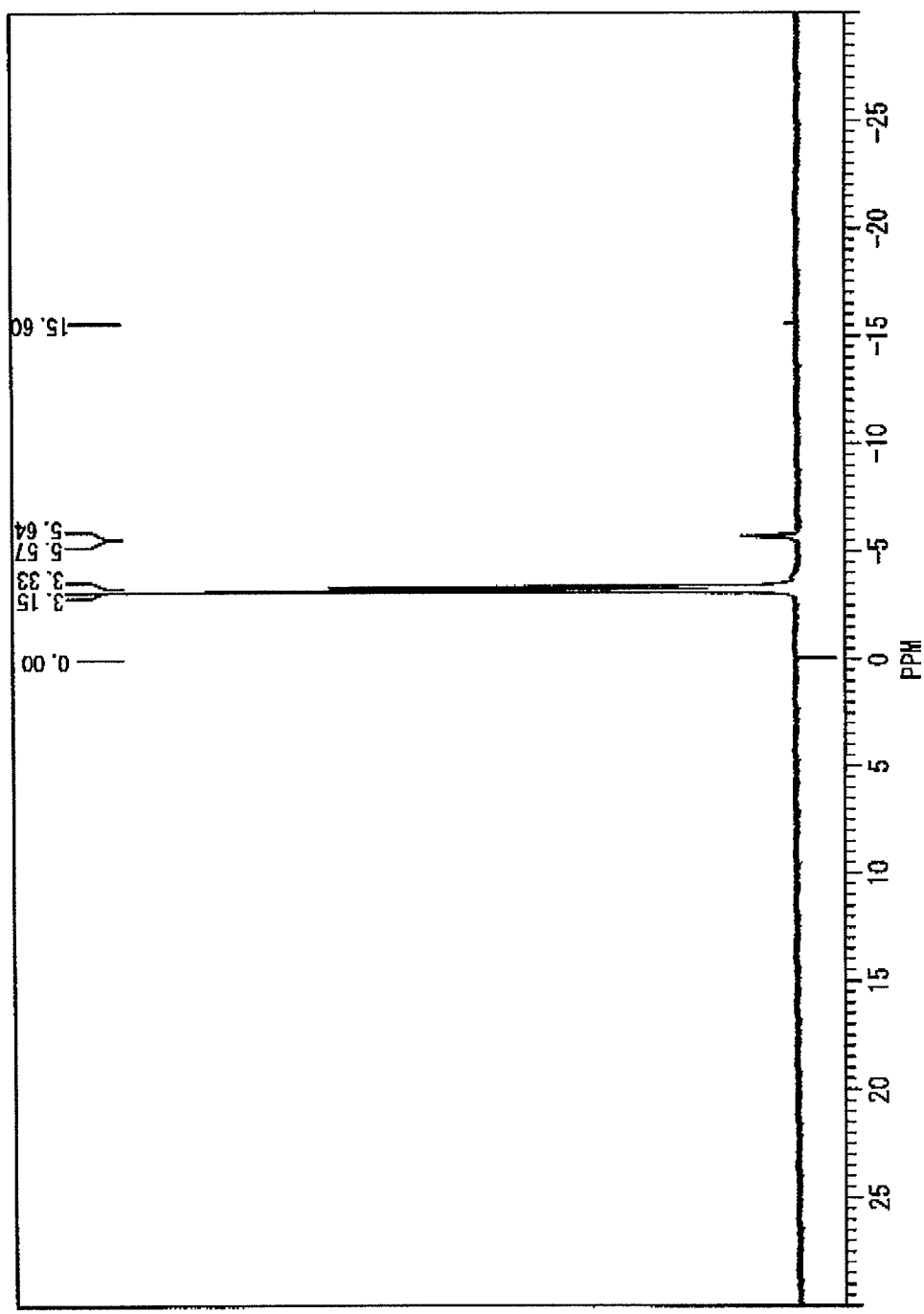
FIG. 5 is a result of $^{31}$P-NMR for the product obtained in the synthesis example 2 of the ionic liquid.

A two-phase system composed of 5 g of water and 5 g of chloroform is prepared, and to the two-phase system are sequentially added dropwise 5 mL of N-methyl-2-pyrrolidone and 5 mL of a cyclic phosphazene compound represented by the general formula (III) wherein n is 3, one of six $R^3$s is chlorine and five thereof are fluorine. The two-phase system is stirred with a stirrer and then heat generation is observed along with a reaction. After stirring for 3 minutes, a water phase is collected and water is evaporated to produce a white crystal. It is further dried under a reduced pressure to obtain 3.6 g of a white crystal (yield: 35.7%). Then, 2 g of the resulting white crystal and 2.3 g of $AgBF_4$ are dissolved in 20 mL of water and stirred for 30 minutes, and then a water phase is collected, water is evaporated and thereby a clear liquid remains. The clear liquid is further dried under a reduced pressure to obtain 1.21 g of an ionic liquid B (yield: 53.3%). The resulting ionic liquid B is dissolved in deuterium oxide and analyzed by $^1$H-NMR to confirm that the ionic liquid B is an ionic compound represented by the general formula (I) wherein n is 3, five of six $R^1$s are fluorine and one thereof is the ionic substituent represented by the general formula (II) wherein $X^-$ is $BF_4^-$, one of $R^2$s is methyl group, the other two $R^2$s are bonded with each other to form 2-azacyclopentanone ring with a nitrogen atom. The result of $^1$H-NMR for the product is shown in FIG. 4, the result of $^{31}$P-NMR for the product is shown in FIG. 5 and the reaction scheme is shown below.

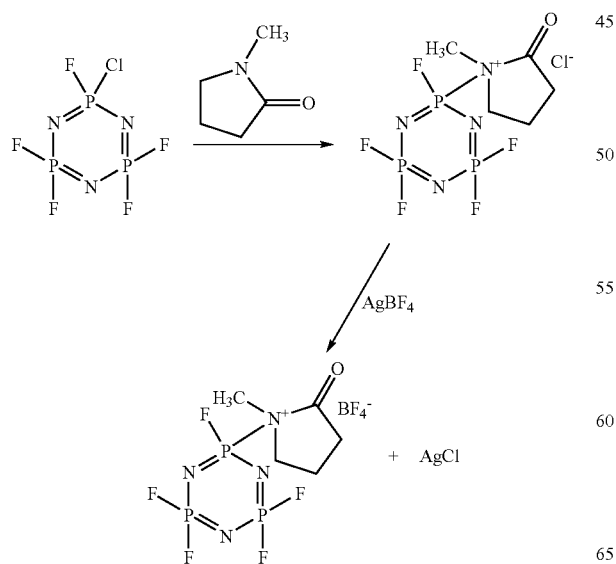

Reaction scheme 2

Synthesis Example 3 of Ionic Liquid

Figure 6:
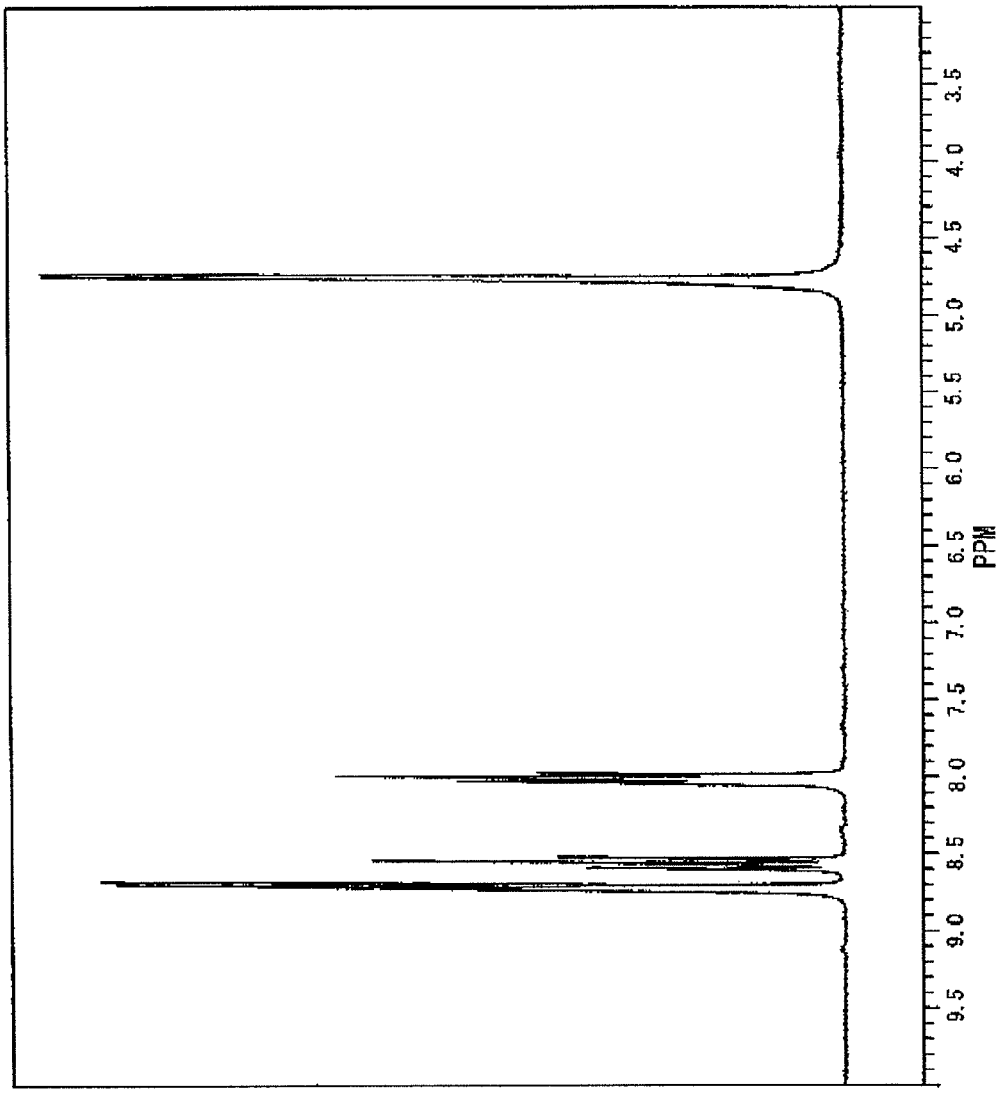
FIG. 6 is a result of $^1$H-NMR for a product obtained in the synthesis example 3 of the ionic liquid.
Figure 7:
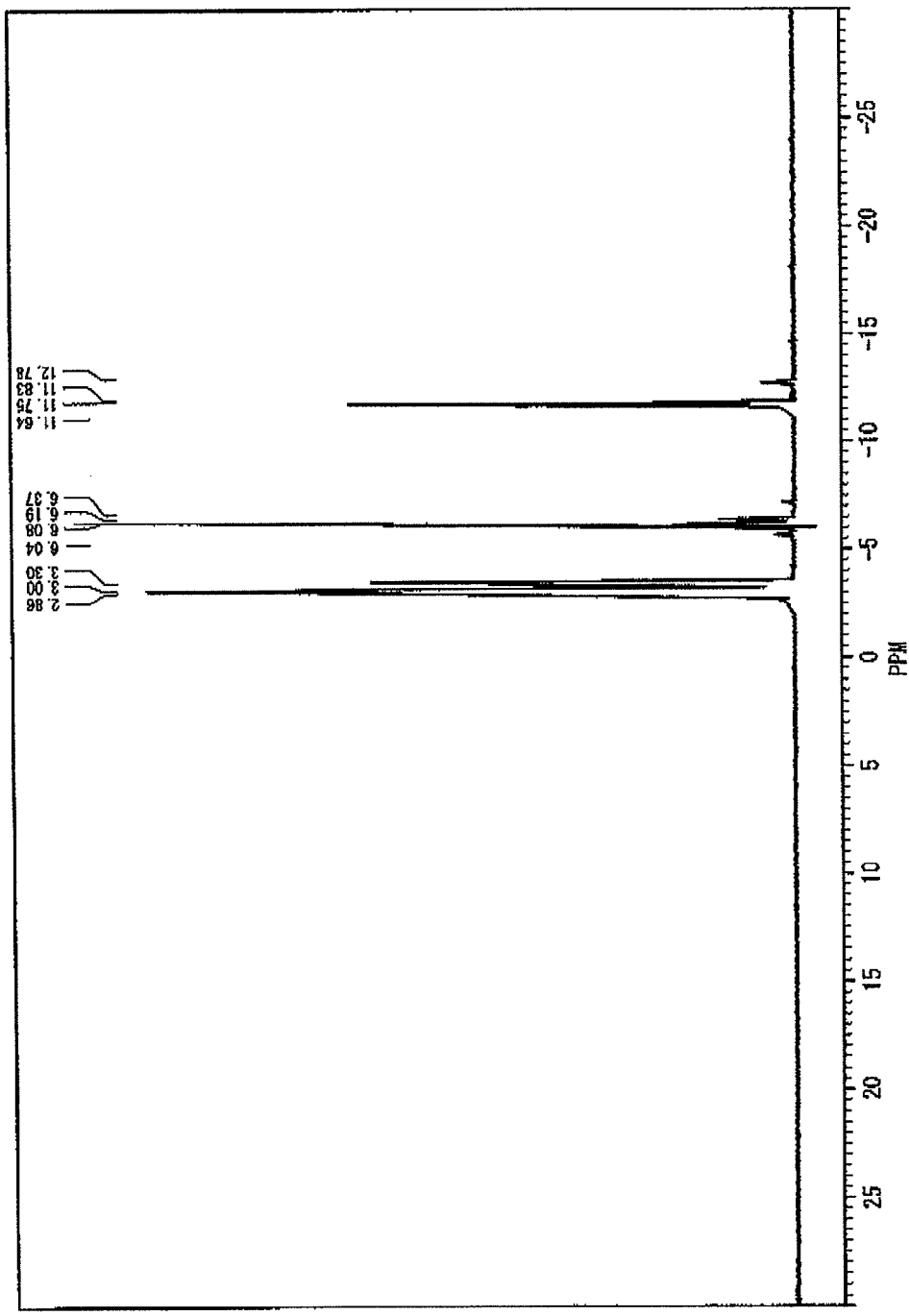
FIG. 7 is a result of $^{31}$P-NMR for the product obtained in the synthesis example 3 of the ionic liquid.

A two-phase system composed of 15 mL of water and 15 mL of chloroform is prepared, and to the two-phase system are sequentially added dropwise 5 mL of pyridine and 5 mL of a cyclic phosphazene compound represented by the general formula (III) wherein n is 3, one of six $R^3$s is chlorine and five thereof are fluorine. The two-phase system is then stirred with cooling and as a result, a white crystal is precipitated in a chloroform phase. It is warmed to room temperature and stirred, and thereby the white crystal disappears. The chloroform phase was colorless before the reaction but becomes clouded after the reaction. A water phase is collected by using a pipette and evaporated, and then water is distilled away by using a vacuum pump to obtain 5.2 g of a white crystal (yield: 57%). Then, 2 g of the resulting white crystal and 2.3 g of $AgBF_4$ are dissolved in 20 mL of water and stirred for 30 minutes, and then a water phase is collected, water is evaporated and thereby a clear liquid remains. The clear liquid is further dried under a reduced pressure to obtain 1.4 g of an ionic liquid C (yield: 60%). The resulting ionic liquid C is dissolved in deuterium oxide and analyzed by $^1$H-NMR to confirm that the ionic liquid C is represented by the general formula (I) wherein n is 3, five of six $R^1$s are fluorine and one thereof is —$N^+C_5H_5BF_4^-$. The result of $^1$H-NMR for the product is shown in FIG. 6, the result of $^{31}$P-NMR for the product is shown in FIG. 7 and the reaction scheme is shown below.

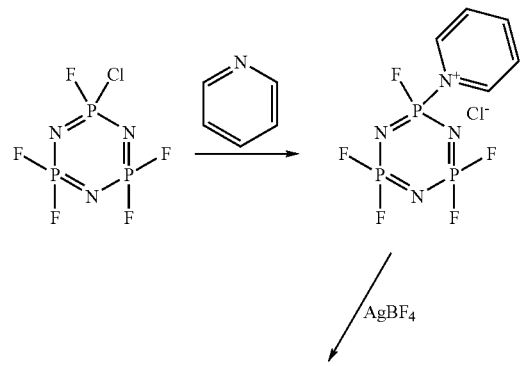

Reaction scheme 3

Synthesis Example 4 of Ionic Liquid

Figure 8:
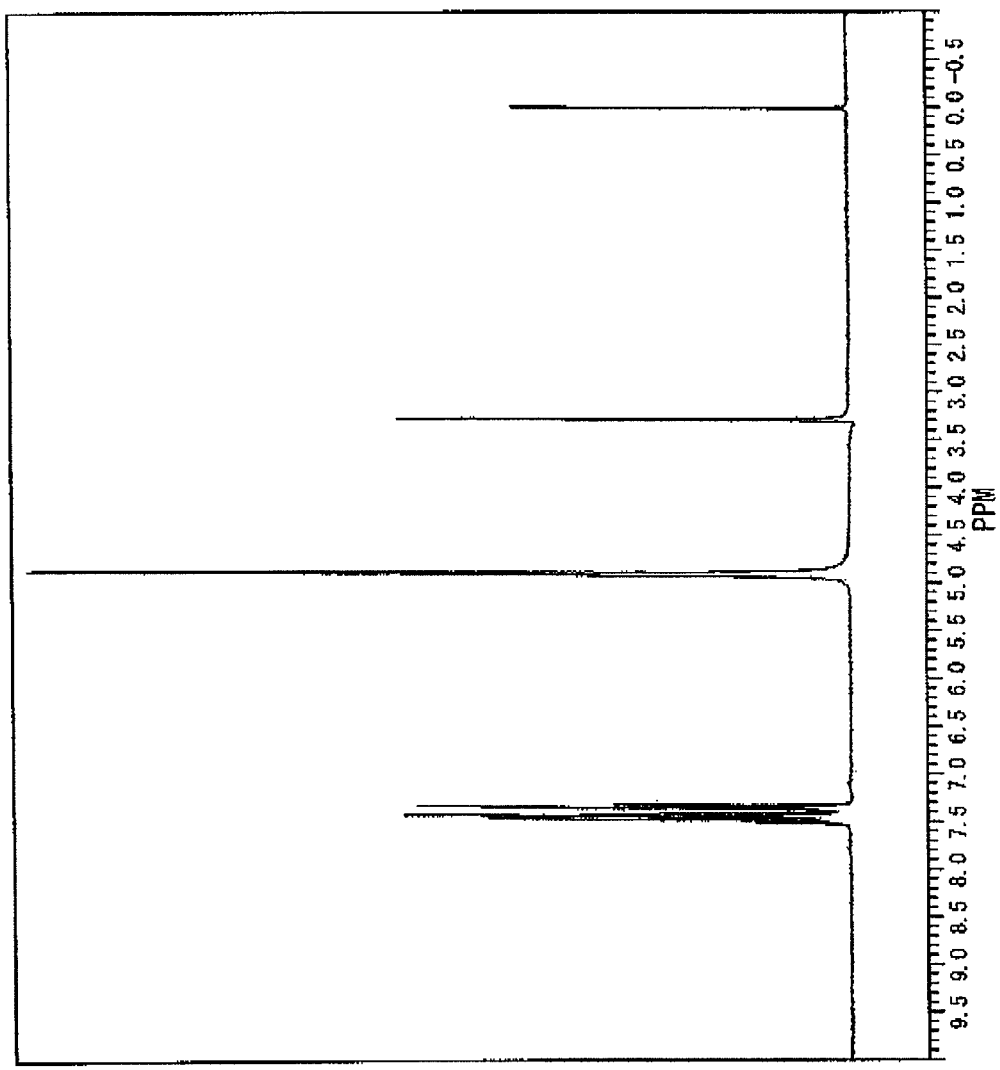
FIG. 8 is a result of $^1$H-NMR for a product obtained in the synthesis example 4 of the ionic liquid.
Figure 9:
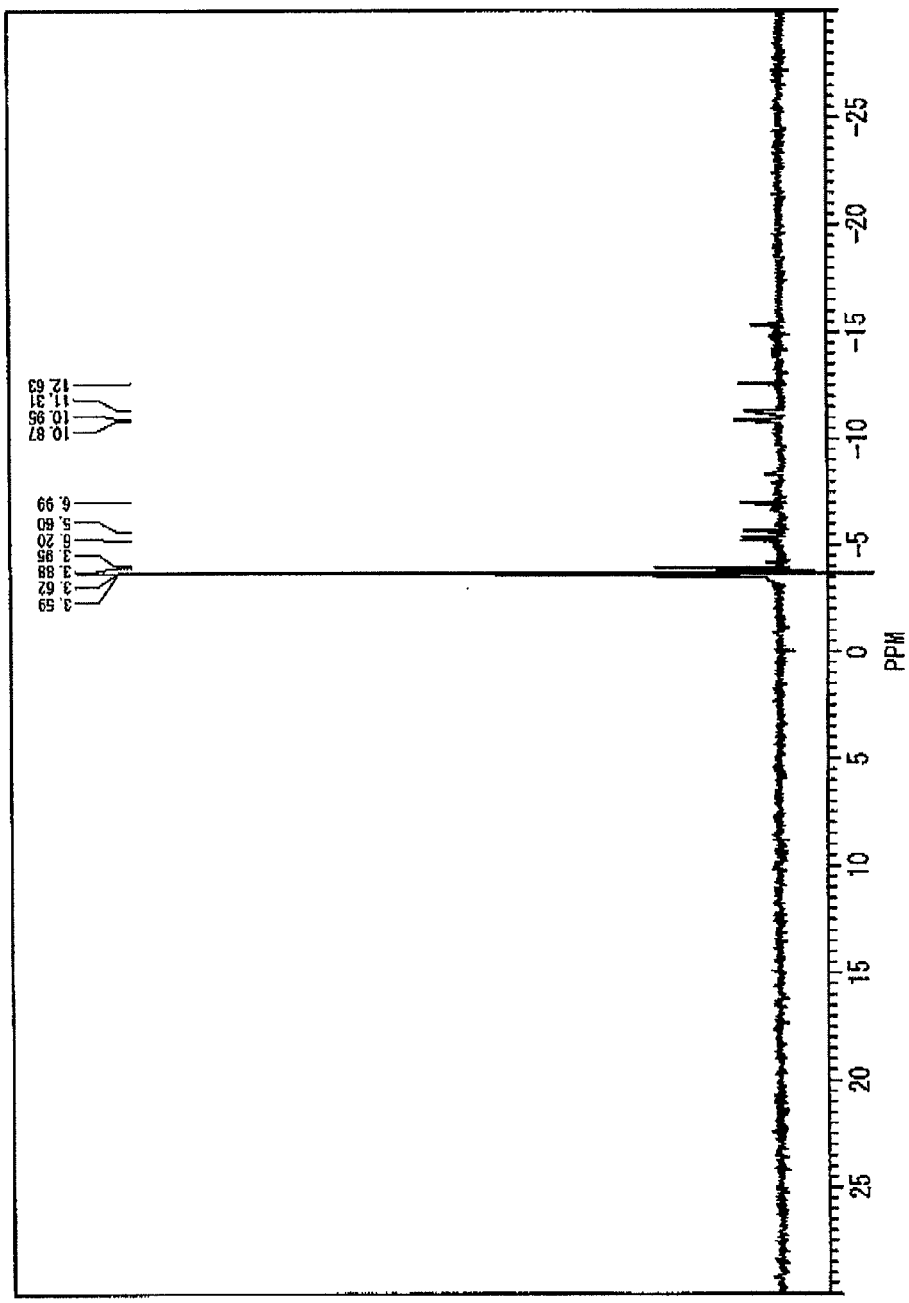
FIG. 9 is a result of $^{31}$P-NMR for the product obtained in the synthesis example 4 of the ionic liquid.

A two-phase system composed of 15 mL of water and 15 mL of chloroform is prepared, and to the two-phase system are sequentially added dropwise 5 mL of aniline and 5 mL of a cyclic phosphazene compound represented by the general formula (III) wherein n is 3, one of six $R^3$s is chlorine and five thereof are fluorine. The two-phase system is then stirred with cooling and as a result, a white crystal is precipitated in a chloroform phase. It is warmed to room temperature and stirred, and thereby the white crystal disappears. The chloroform phase was colorless before the reaction but becomes clouded after the reaction. A water phase is collected by using a pipette and evaporated, and then water is distilled away by using a vacuum pump to obtain 4.8 g of a white crystal (yield: 54%). Then, 2 g of the resulting white crystal and 2.3 g of $AgBF_4$ are dissolved in 20 mL of water and stirred for 30 minutes, and then a water phase is collected, water is evaporated and thereby a clear liquid remains. The clear liquid is further dried under a reduced pressure to obtain 1.6 g of an ionic liquid ID (yield: 72%). The resulting ionic liquid D is dissolved in deuterium oxide and analyzed by $^1$H-NMR to confirm that the ionic liquid ID is represented by the general formula (I) wherein n is 3, five of six $R^1$s are fluorine and one thereof is —$N^+H_2C_6H_5BF_4^-$. The result of $^1$H-NMR for the product is shown in FIG. 8, the result of $^{31}$P-NMR for the product is shown in FIG. 9 and the reaction scheme is shown below.

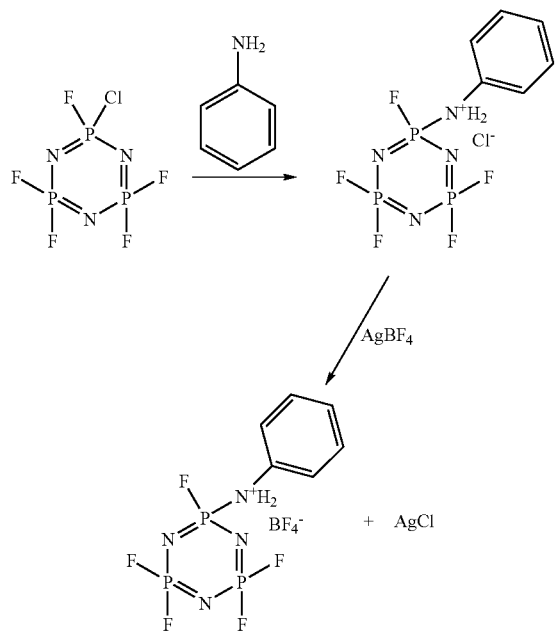

Synthesis Example 5 of Ionic Liquid

Figure 10:
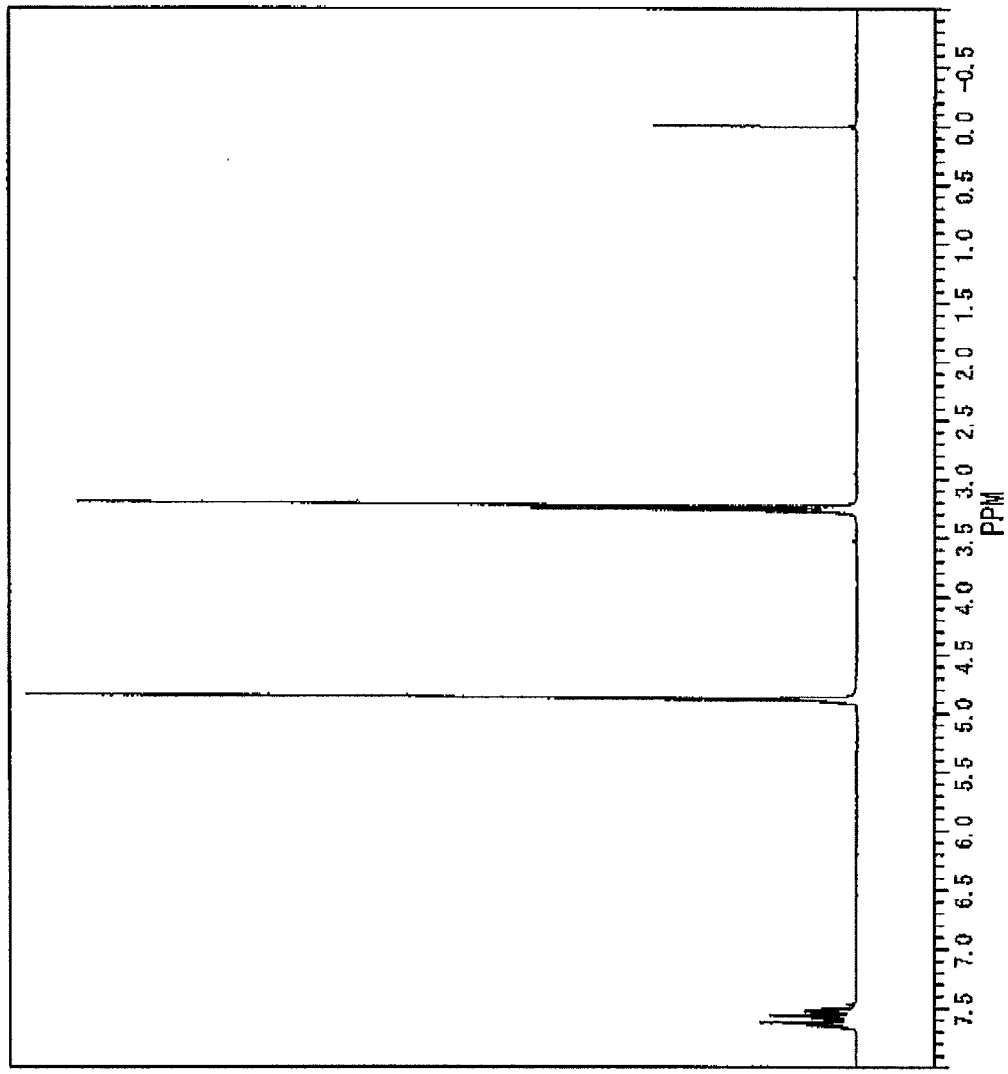
FIG. 10 is a result of $^1$H-NMR for a product obtained in the synthesis example 5 of the ionic liquid.
Figure 11:
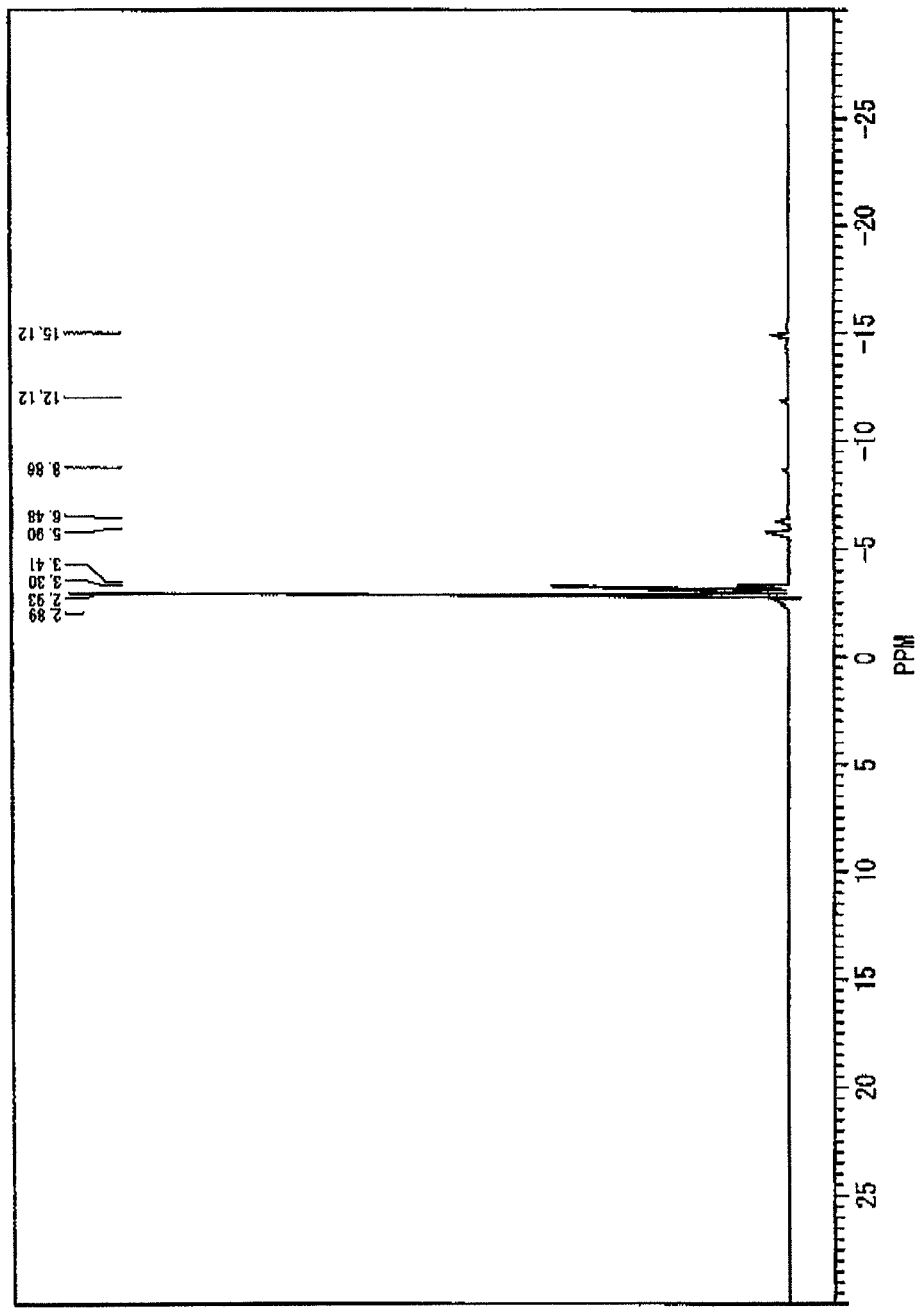
FIG. 11 is a result of $^{31}$P-NMR for the product obtained in the synthesis example 5 of the ionic liquid.

A two-phase system composed of 15 mL of water and 15 mL of chloroform is prepared, and to the two-phase system are sequentially added dropwise 5 mL of dimethylaniline and 5 mL of a cyclic phosphazene compound represented by the general formula (III) wherein n is 3, one of six $R^3$s is chlorine and five thereof are fluorine. The two-phase system is then stirred with cooling and as a result, a white crystal is precipitated in a chloroform phase. It is warmed to room temperature and stirred, and thereby the white crystal disappears. The chloroform phase was colorless before the reaction but becomes clouded after the reaction. A water phase is collected by using a pipette and evaporated, and then water is distilled away by using a vacuum pump to obtain 5.1 g of a white crystal (yield: 52%). Then, 2 g of the resulting white crystal and 2.3 g of $AgBF_4$ are dissolved in 20 mL of water and stirred for 30 minutes, and then a water phase is collected, water is evaporated and thereby a clear liquid remains. The clear liquid is further dried under a reduced pressure to obtain 1.5 g of an ionic liquid E (yield: 65%). The resulting ionic liquid E is dissolved in deuterium oxide and analyzed by $^1$H-NMR to confirm that the ionic liquid E is represented by the general formula (I) wherein n is 3, five of six $R^1$s are fluorine and one thereof is —$N^+(CH_3)_2C_6H_5BF_4^-$. The result of $^1$H-NMR for the product is shown in FIG. 10, the result of $^{31}$P-NMR for the product is shown in FIG. 11 and the reaction scheme is shown below.

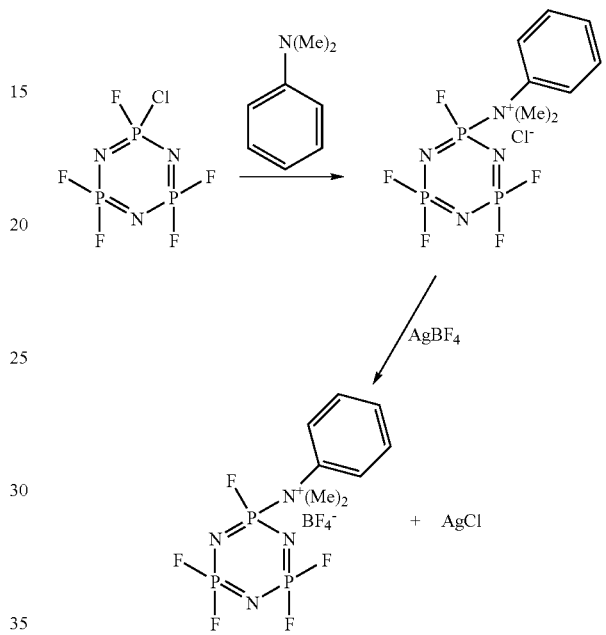

Synthesis Example 6 of Ionic Liquid 2 g of a reaction product of triethylamine and a cyclic phosphazene compound represented by the general formula (III) wherein n is 3, one of six $R^3$s is chlorine and five thereof are fluorine, which is synthesized in the same manner as in the synthesis example 1 of the ionic liquid, is reacted with 1.5 g of $LiCF_3SO_3$, further reacted with 1 g of $LiCF_3SO_3$ and filtered to obtain 1.54 g of an ionic liquid F [an ionic liquid represented by the general formula (I) wherein n is 3, five of six $R^1$s are fluorine and one thereof is —$N^+(CH_2CH_2)_3 \cdot CF_3SO_3^-$] (yield: 61%).

Synthesis Example 7 of Ionic Liquid

An ionic liquid G is obtained in the same manner as in the synthesis example 1 of the ionic liquid except that $AgPF_6$ is used instead of $AgBF_4$. The resulting ionic liquid G is analyzed by $^1$H-NMR to confirm that the ionic liquid G is represented by the general formula (I) wherein n is 3, five of six $R^1$s are fluorine and one thereof is —$N^+(CH_2CH_2)_3PF_6^-$.

Synthesis Example 8 of Ionic Liquid

An ionic liquid H is obtained in the same manner as in the synthesis example 4 of the ionic liquid except that $AgPF_6$ is used instead of $AgBF_4$. The resulting ionic liquid H is analyzed by $^1$H-NMR to confirm that the ionic liquid H is represented by the general formula (I) wherein n is 3, five of six $R^1$s are fluorine and one thereof is —$N^+H_2C_6H_5PF_6^-$.

Synthesis Example 9 of Ionic Liquid

An ionic liquid I is obtained in the same manner as in the synthesis example 5 of the ionic liquid except that $AgPF_6$ is used instead of $AgBF_4$. The resulting ionic liquid I is analyzed by $^1$H-NMR to confirm that the ionic liquid I is represented by the general formula (I) wherein n is 3, five of six $R^1$s are fluorine and one thereof is —$N^+(CH_3)_2C_6H_5PF_6^-$.

Example 1

$LiPF_6$ (supporting salt) is dissolved in the ionic liquid A synthesized as described above at a concentration of 1 mol/L (M) to prepare a non-aqueous electrolyte. The safety of the non-aqueous electrolyte thus obtained is evaluated by the following method. The result is shown in Table 1.

(1) Safety of the Electrolyte

The safety of the electrolyte is evaluated by measuring a combustion behavior of a flame ignited under an atmospheric environment according to a method arranging UL94HB method of UL (Underwriting Laboratory) standard. In this case, the ignitability, combustibility, carbide formation and phenomenon in secondary ignition are also observed. Concretely, a test piece of 127 mm×12.7 mm is prepared by penetrating 1.0 mL of the electrolyte into a non-combustible quartz fiber based on UL test standard. At this moment, "non-combustibility" means a property that a test flame does not ignite a test piece (combustion length: 0 mm), "flame retardance" means a property that the ignited flame does not arrive at a line of 25 mm and the ignition is not observed in the falling object, "self-extinguishing property" means a property that the ignited flame extinguishes at a line of 25-100 mm and the ignition is not observed in a falling object, and "combustion property" means a property that the ignited flame exceeds a line of 100 mm.

<Preparation of Lithium Secondary Battery>

Then, lithium-cobalt composite oxide ($LiCoO_2$) or lithium-manganese composite oxide ($LiMn_2O_4$) is used as an active material for a positive electrode, and this composite oxide, acetylene black as an electrically conducting agent and fluorocarbon resin as a binding agent are mixed at a mass ratio of 90:5:5 and dispersed into N-methylpyrrolidone to prepare a slurry, and the slurry is applied on an aluminum foil as a collector for a positive electrode, dried and then punched out in the form of a disk of 16 mmφ to make a positive electrode.

On the other hand, a lithium foil (thickness: 0.5 mm) is punched out at 16 mmφ to form a negative electrode. Then, the positive and negative electrodes are overlapped through a separator (micro-porous film: made of polypropylene) impregnated with the electrolyte, and accommodated in a stainless case serving as a positive terminal, and sealed with a stainless sealing plate serving as a negative terminal through a polypropylene gasket to prepare a coin-type battery (lithium secondary battery) of CR 2016 model having a capacity of 4 mAh. The initial discharge capacity and the discharge capacity after 10 cycles of the thus obtained battery are measured by the following methods to obtain results shown in Table 1.

(2) Initial Discharge Capacity and Discharge Capacity After 10 Cycles

The battery is charged and discharged in an atmosphere of 20° C. under conditions of upper limit voltage: 4.2 V, lower limit voltage: 3.0 V, discharge current: 50 mA and recharge current: 50 mA, and the discharge capacity measured at this time is divided by a known weight of the electrode to determine the initial discharge capacity (mAh/g). Furthermore, the discharge-recharge are repeated up to 10 cycles under the same discharge-recharge conditions to determine the discharge capacity after 10 cycles.

Examples 2-6

$LiPF_6$ (supporting salt) is dissolved in the ionic liquids B—F synthesized as described above at a concentration of 1 mol/L (M) to prepare non-aqueous electrolytes. The safeties of the non-aqueous electrolytes thus obtained are evaluated by the above-described method. Further, lithium secondary batteries are made by using the non-aqueous electrolytes in the same manner as in Example 1, and the initial discharge capacities and the discharge capacities after 10 cycles are measured. The results are shown in Table 1.

Comparative Example 1

A non-aqueous electrolyte is prepared by dissolving $LiPF_6$ at a concentration of 1 mol/L in a mixed solvent comprising 50% by volume of ethylene carbonate (EC) and 50% by volume of diethyl carbonate (DEC). The safety of the non-aqueous electrolyte thus obtained is evaluated by the above-described method. Further, a lithium secondary battery is made by using the non-aqueous electrolyte in the same manner as in Example 1, and the initial discharge capacity and the discharge capacity after 10 cycles are measured. The results are shown in Table 1.

TABLE 1

| | Solvent of electrolyte | Safety of electrolyte | Battery using $LiCoO_2$ in the positive electrode | | Battery using $LiMn_2O_4$ in the positive electrode | |
|---|---|---|---|---|---|---|
| | | | Initial discharge capacity (mAh/g) | Discharge capacity after 10 cycles (mAh/g) | Initial discharge capacity (mAh/g) | Discharge capacity after 10 cycles (mAh/g) |
| Example 1 | Ionic liquid A | Non-combustibility | 140 | 137 | 109 | 105 |
| Example 2 | Ionic liquid B | Non-combustibility | 138 | 132 | 108 | 102 |
| Example 3 | Ionic liquid C | Non-combustibility | 140 | 131 | 108 | 101 |
| Example 4 | Ionic liquid D | Non-combustibility | 140 | 131 | 107 | 100 |
| Example 5 | Ionic liquid E | Non-combustibility | 139 | 136 | 107 | 100 |
| Example 6 | Ionic liquid F | Non-combustibility | 140 | 135 | 108 | 101 |
| Comparative Example 1 | EC/DEC | Combustion property | 142 | 110 | 110 | 98 |

As seen from Table 1, the electrolyte comprising the ionic liquid containing phosphorus and nitrogen in its cation portion and the supporting salt has a high safety, and the cyclability of the lithium secondary battery can be improved by using the electrolyte in the battery.

Examples 7-16 and Comparative Example 2

Non-aqueous electrolytes are prepared by dissolving $LiPF_6$ at a concentration of 1 mol/L in the solvents according to formulations shown in Table 2. In Table 2, EC/PC/DMC is a mixed organic solvent containing ethylene carbonate (EC), propylene carbonate (PC) and dimethyl carbonate (DMC) at a mass ratio of 1/1/3. The safeties of the non-aqueous electrolytes thus obtained are evaluated by the above-described method. Further, lithium secondary batteries are made by using the non-aqueous electrolytes in the same manner as in Example 1, and the initial discharge capacities and the discharge capacities after 20 cycles are measured. The results are shown in Table 2.

ing the kneaded mass with a doctor blade, drying in hot air (100-120° C.) and cutting out through a punching machine of 16 mmϕ. Moreover, a mass of the positive electrode is 20 mg. Further, a lithium foil (thickness: 0.5 mm) punched out at 16 mmϕ is used as a negative electrode, and a nickel foil is used as a collector. The positive and negative electrodes are set opposite to each other through a cellulose separator [TF4030, made by Nippon Kodo Kami-kogyo Co., Ltd.], and the above-mentioned electrolyte is poured and sealed to prepare a lithium primary battery (non-aqueous electrolyte primary battery) of CR 2016 model. A 0.2C discharge is conducted in an atmosphere of 25° C. at a lower limit voltage of 1.5V to measure a discharge capacity of the battery thus obtained. Further, another battery made in the same manner as in the above description is stored at 120° C. for 60 hours, a discharge capacity at normal temperature is measured after the storage in the same manner as in the above description. Furthermore, the discharge capacity at normal temperature after the storage at 120° C. for 60 hours is divided by a discharge capacity at

TABLE 2

| | Solvent of electrolyte | | | Battery using $LiCoO_2$ in the positive electrode | | Battery using $LiMn_2O_4$ in the positive electrode | |
|---|---|---|---|---|---|---|---|
| | Kind of ionic liquid (Amount: vol %) | Amount of EC/PC/DMC (vol %) | Safety of electrolyte | Initial discharge capacity (mAh/g) | Discharge capacity after 20 cycles (mAh/g) | Initial discharge capacity (mAh/g) | Discharge capacity after 20 cycles (mAh/g) |
| Example 7 | Ionic liquid F (10 vol %) | 90 vol % | Non-combustibility | 141 | 135 | 110 | 105 |
| Example 8 | Ionic liquid G (5 vol %) | 95 vol % | Non-combustibility | 140 | 136 | 110 | 105 |
| Example 9 | Ionic liquid G (10 vol %) | 90 vol % | Non-combustibility | 138 | 136 | 110 | 104 |
| Example 10 | Ionic liquid H (5 vol %) | 95 vol % | Non-combustibility | 137 | 135 | 109 | 105 |
| Example 11 | Ionic liquid H (10 vol %) | 90 vol % | Non-combustibility | 137 | 135 | 109 | 105 |
| Example 12 | Ionic liquid I (10 vol %) | 90 vol % | Non-combustibility | 136 | 135 | 110 | 103 |
| Example 13 | Ionic liquid G (1 vol %) | 99 vol % | Combustion property | 140 | 135 | 112 | 107 |
| Example 14 | Ionic liquid G (3 vol %) | 97 vol % | Combustion property | 140 | 135 | 110 | 105 |
| Example 15 | Ionic liquid H (3 vol %) | 97 vol % | Combustion property | 140 | 138 | 112 | 105 |
| Example 16 | Ionic liquid I (3 vol %) | 97 vol % | Combustion property | 140 | 137 | 110 | 104 |
| Comparative Example 2 | None | 100 vol % | Combustion property | 139 | 135 | 112 | 105 |

As seen from Table 2, the safety of the electrolyte having an ionic liquid content of not less than 5% by volume becomes very high, when the aprotic organic solvent is included.

Example 17

$LiBF_4$ (supporting salt) is dissolved in the ionic liquid A synthesized as described above at a concentration of 1 mol/L (M) to prepare a non-aqueous electrolyte. The safety of the non-aqueous electrolyte thus obtained is evaluated by the above method. The result is shown in Table 3.

<Preparation of Lithium Primary Battery>

A positive electrode is prepared by mixing and kneading $MnO_2$ (active material for a positive electrode), acetylene black (electrically conducting agent) and polyvinylidene fluoride (binding agent) at a ratio of 8:1:1 (mass ratio), apply-normal temperature immediately after the preparation to calculate a discharge capacity remaining ratio after the high-temperature storage. The results are shown in Table 3.

Examples 18-21

$LiBF_4$ (supporting salt) is dissolved in the ionic liquids B-E synthesized as described above at a concentration of 1 mol/L (M) to prepare non-aqueous electrolytes. The safeties of the non-aqueous electrolytes thus obtained are evaluated by the above-described method. Further, lithium primary batteries are made by using the non-aqueous electrolytes in the same manner as in Example 17, the discharge capacities immediately after the preparation, and the discharge capacities after the high-temperature storage are measured and the discharge capacity remaining ratios after the high-temperature storage are calculated. The results are shown in Table 3.

Comparative Example 3

A non-aqueous electrolyte is prepared by dissolving $LiBF_4$ at a concentration of 1 mol/L in a mixed solvent comprising 50% by volume of propylene carbonate (PC) and 50% by volume of 1,2-dimethoxy ethane (DME). The safety of the non-aqueous electrolyte thus obtained is evaluated by the above-described method. Further, a lithium primary battery is made by using the non-aqueous electrolyte in the same manner as in Example 17, the discharge capacity immediately after the preparation and the discharge capacity after the high-temperature storage are measured, and the discharge capacity remaining ratio after the high-temperature storage is calculated. The results are shown in Table 3.

TABLE 3

|  | Solvent of electrolyte | Safety of electrolyte | Discharge capacity immediately after preparation (mAh/g) | Discharge capacity after high-temperature storage (mAh/g) | Discharge capacity remaining ratio after high-temperature storage (%) |
|---|---|---|---|---|---|
| Example 17 | Ionic liquid A | Non-combustibility | 265 | 235 | 88.7 |
| Example 18 | Ionic liquid B | Non-combustibility | 260 | 221 | 85.0 |
| Example 19 | Ionic liquid C | Non-combustibility | 260 | 220 | 84.6 |
| Example 20 | Ionic liquid D | Non-combustibility | 262 | 210 | 80.2 |
| Example 21 | Ionic liquid E | Non-combustibility | 262 | 230 | 87.8 |
| Comparative Example 3 | PC/DME | Combustion property | 273 | 170 | 62.3 |

As seen from Table 3, the electrolyte comprising the ionic liquid containing phosphorus and nitrogen in its cation portion and the supporting salt has a high safety, and the discharge capacity at normal temperature of the primary battery after the high-temperature storage can be improved by using the electrolyte in the battery to improve the high-temperature storage property of the battery.

<Safety of the Ionic Liquid>

The safeties of the ionic liquids A-F themselves synthesized as described above are evaluated by penetrating the ionic liquids A-F themselves instead of the electrolyte into the non-combustible quartz fiber in the same manner as in the above-mentioned safety of the electrolyte. Further, a safety of a commercially available ionic liquid J is evaluated for a comparison. The ionic liquid J for the comparison is N,N-diethyl-N-methyl-N-(2-methoxyethyl)ammonium tetrafluoroborate [made by KANTO CHEMICAL CO., INC]. The results are shown in Table 4.

<Preparation of Electric Double Layer Capacitor>

Then, an active carbon [AC, trade name: Kuractive-1500, made by Kurare Chemical Co., Ltd.], acetylene black (electrically conducting agent) and polyvinylidene fluoride (binding agent) are mixed at a mass ratio (active carbon:electrically conducting agent:binding agent) of 8:1:1 to obtain a mixture. 100 g of the resulting mixture is weighed and placed in a carbon pressure vessel of 20 mmφ and green-compacted at room temperature under a pressure of 150 kgf/cm² to prepare a positive electrode and a negative electrode (electrodes). A cell is assembled by using the resulting electrodes (positive and negative electrodes), an aluminum metal plate (collector, thickness: 0.5 mm) and a polypropylene/polyethylene plate (separator, thickness: 25 μm) and sufficiently dried through vacuum drying. This cell is impregnated with the ionic liquids A-F or J as the electrolyte to prepare an electric double layer capacitor. The low-temperature characteristics and the high-rate discharge performance of the electric double layer capacitor thus obtained are measured by the following methods. The results are shown in Table 4.

(3) Low-Temperature Characteristics of the Electric Double Layer Capacitor

The discharge capacity of the resulting electric double layer capacitor is measured in an atmosphere of 20° C. or −10° C., respectively, and from a ratio thereof, i.e.:

(capacity at −10° C.)/(capacity at 20° C.)×100(%)

the low-temperature characteristics are evaluated. The larger the ratio, the better the low-temperature characteristics.

(4) High-Rate Discharge Performance of the Electric Double Layer Capacitor

The discharge capacity of the resulting electric double layer capacitor is measured at an hour rate of 1 C or 5 C, respectively, and from a ratio thereof, i.e.:

(capacity at 5 C)/(capacity at 1 C)×100(%)

the high-rate discharge performance is evaluated. The larger the ratio, the better the high-rate discharge performance. In this connection, 1 C means a condition wherein the full capacity of the resulting capacitor is discharged in 1/1 hour (60 minutes) and 5 C means a condition wherein the full capacity of the resulting capacitor is discharged in 1/5 hour (12 minutes).

TABLE 4

| | Ionic liquid | | | | High-rate |
|---|---|---|---|---|---|
| | Sort | Content in electrolyte (vol %) | Safety of ionic liquid | Low-temperature characteristics of capacitor (%) | discharge performance of capacitor (%) |
| Example 22 | Ionic liquid A | 100 | Non-combustibility | 55 | 64 |
| Example 23 | Ionic liquid B | 100 | Non-combustibility | 48 | 56 |
| Example 24 | Ionic liquid C | 100 | Non-combustibility | 58 | 55 |
| Example 25 | Ionic liquid D | 100 | Non-combustibility | 63 | 67 |
| Example 26 | Ionic liquid E | 100 | Non-combustibility | 62 | 60 |
| Example 27 | Ionic liquid F | 100 | Non-combustibility | 58 | 63 |
| Comparative Example 4 | Ionic liquid J | 100 | Self-extinguishing property | 35 | 45 |

As seen from Table 4, the electrolyte comprising the ionic liquid containing phosphorus and nitrogen in its cation portion has a high safety, and the low-temperature characteristics and the high-rate discharge performance of the electric double layer capacitor can be improved by using the electrolyte in the capacitor.

The invention claimed is:

1. A non-aqueous electrolyte for a battery, which comprises an ionic liquid composed of a cation portion and an anion portion, and a supporting salt, characterized in that the cation portion of the ionic liquid contains phosphorus and nitrogen, and the ionic liquid is represented by the following general formula (I):

$$(NPR^1_2)_n \qquad (I)$$

[wherein $R^1$s are independently a halogen element or a monovalent substituent, provided that at least one of $R^1$s is an ionic substituent represented by the following general formula (II):

$$-N^+R^2_3X^- \qquad (II)$$

(wherein $R^2$s are independently a monovalent substituent or hydrogen, provided that at least one of $R^2$s is not hydrogen and $R^2$s may be bonded with each other to form a ring; and $X^-$ is a monovalent anion); and n is 3 to 15].

2. A non-aqueous electrolyte for a battery according to claim 1, which consists of the ionic liquid and the supporting salt.

3. A non-aqueous electrolyte for a battery according to claim 1, which further comprises an aprotic organic solvent.

4. A non-aqueous electrolyte for a battery according to claim 3, which comprises not less than 5% by volume of the ionic liquid.

5. A non-aqueous electrolyte for a battery according to claim 1, wherein n in the general formula (I) is 3 or 4.

6. A non-aqueous electrolyte for a battery according to claim 1, wherein at least one of $R^1$s in the general formula (I) is the ionic substituent represented by the general formula (II) and the other is fluorine.

7. A non-aqueous electrolyte battery comprising a non-aqueous electrolyte for a battery as claimed in any one of claims 1-4, 5 and 6, a positive electrode and a negative electrode.

8. An electrolyte for an electric double layer capacitor, which comprises an ionic liquid composed of a cation portion and an anion portion, characterized in that the cation portion of the ionic liquid contains phosphorus and nitrogen, and the ionic liquid is represented by the following general formula (I):

$$(NPR^1_2)_n \qquad (I)$$

[wherein $R^1$s are independently a halogen element or a monovalent substituent, provided that at least one of $R^1$s is an ionic substituent represented by the following general formula (II):

$$-N^+R^2_3X^- \qquad (II)$$

(wherein $R^2$s are independently a monovalent substituent or hydrogen, provided that at least one of $R^2$s is not hydrogen and $R^2$s may be bonded with each other to form a ring; and $X^-$ is a monovalent anion); and n is 3 to 15].

9. An electrolyte for an electric double layer capacitor according to claim 8, which consists of the ionic liquid.

10. An electrolyte for an electric double layer capacitor according to claim 8, wherein n in the general formula (I) is 3 or 4.

11. An electrolyte for an electric double layer capacitor according to claim 8, wherein at least one of $R^1$s in the general formula (I) is the ionic substituent represented by the general formula (II) and the other is fluorine.

12. An electric double layer capacitor comprising an electrolyte for an electric double layer capacitor as claimed in any one of claims 8, 9, 10 and 11, a positive electrode and a negative electrode.

* * * * *